March 9, 1954     E. S. CORNELL     2,671,294
HYDRAULICALLY DRIVEN MACHINE TOOL
Filed Dec. 16, 1950     9 Sheets-Sheet 1
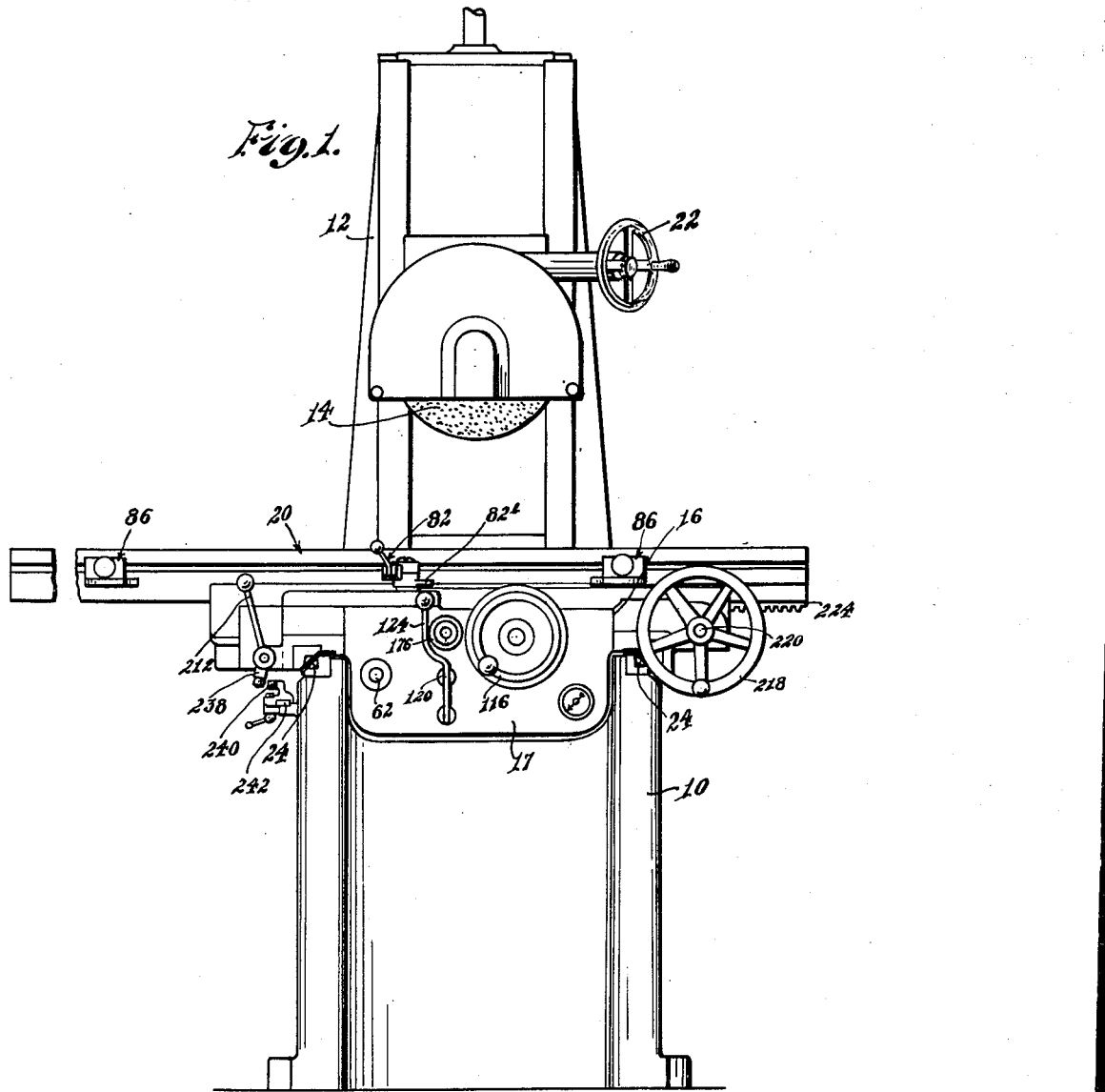

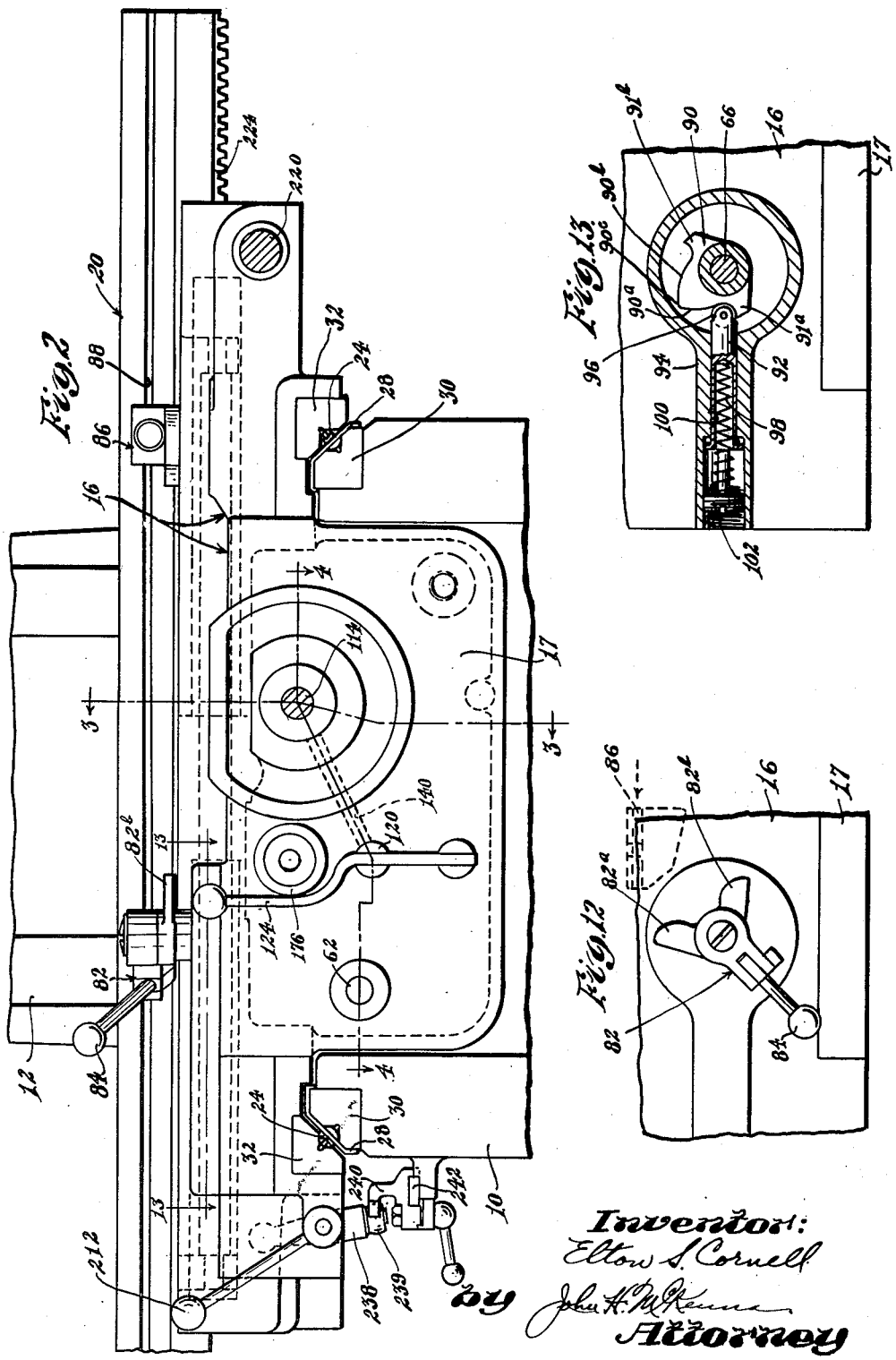

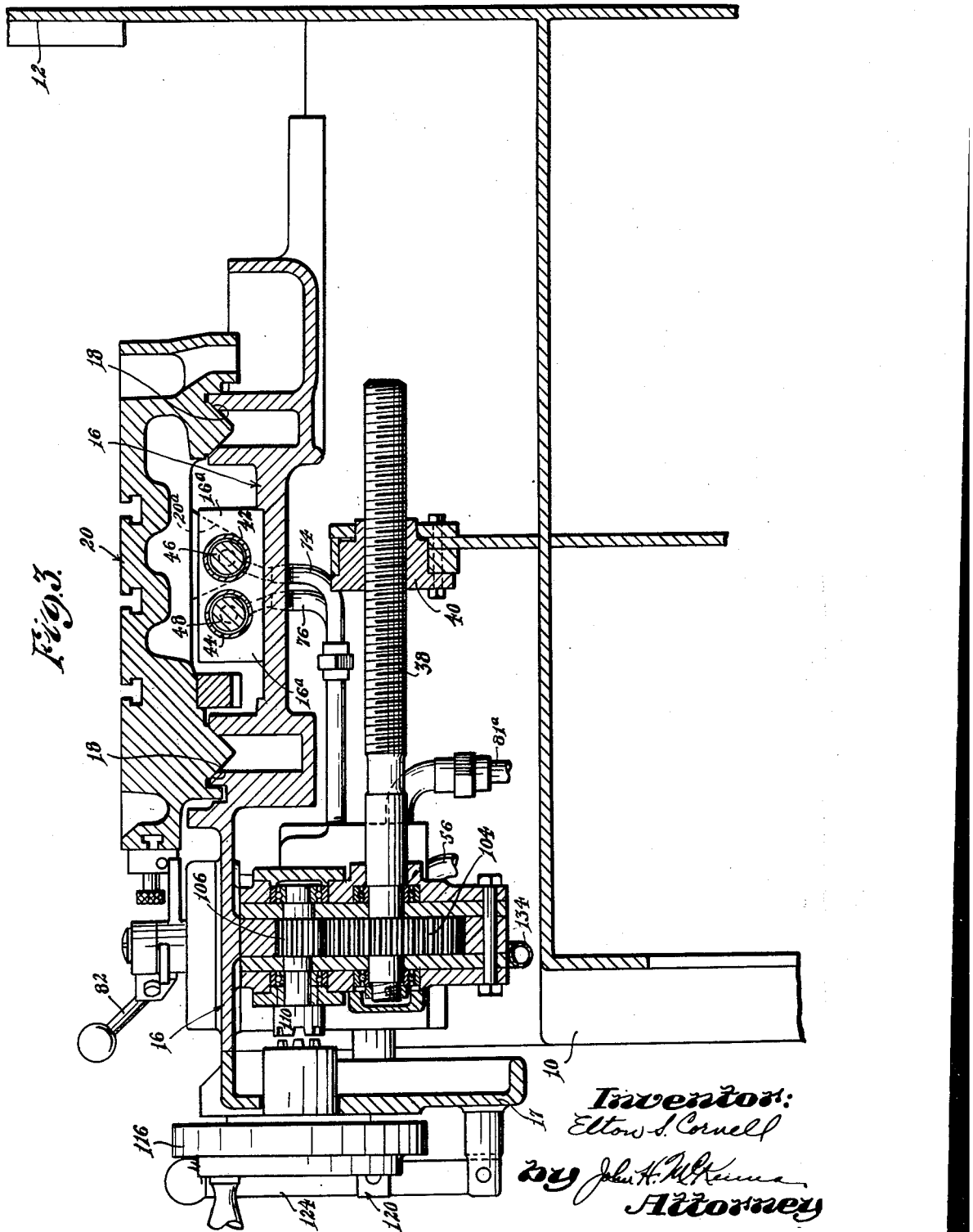

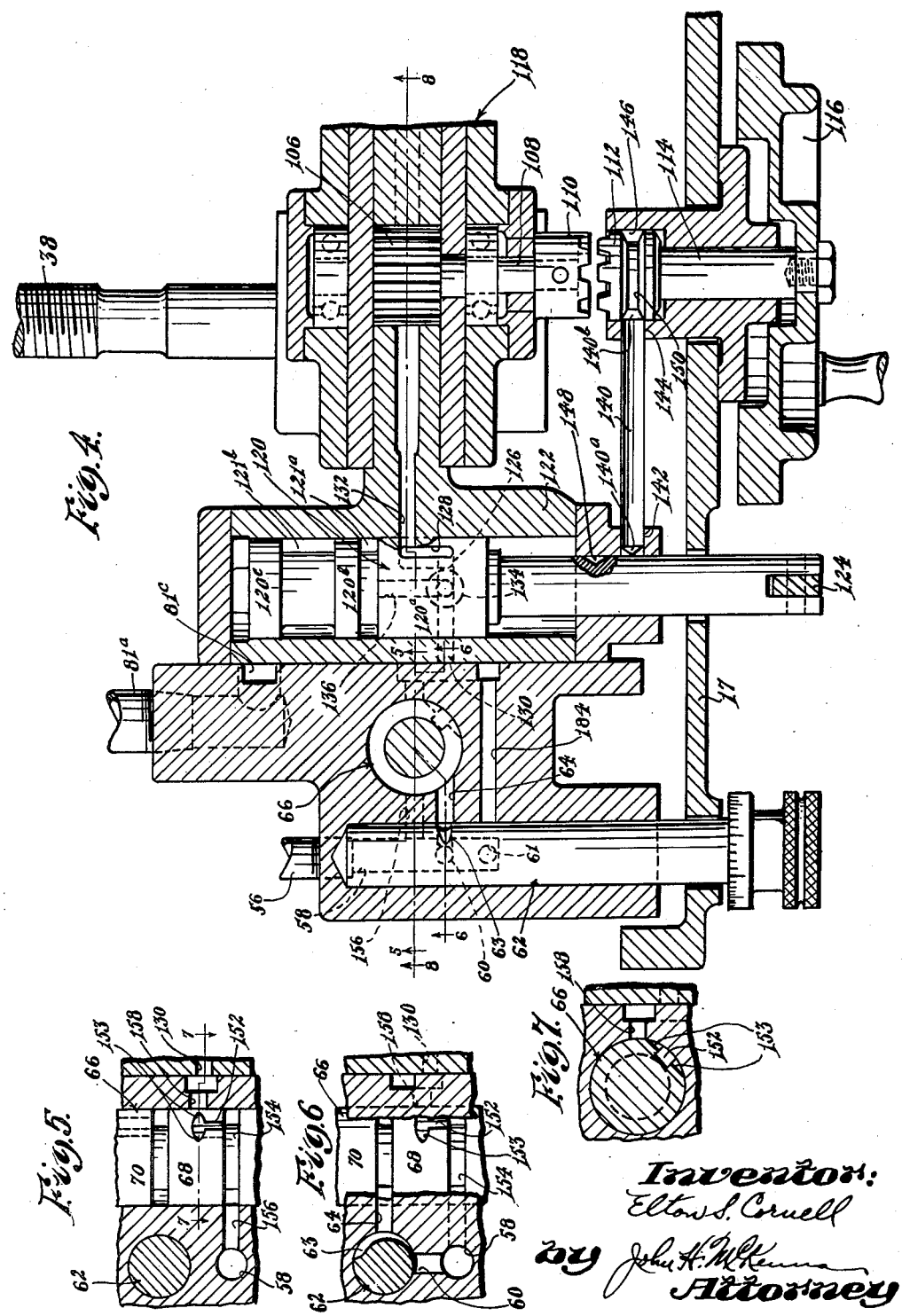

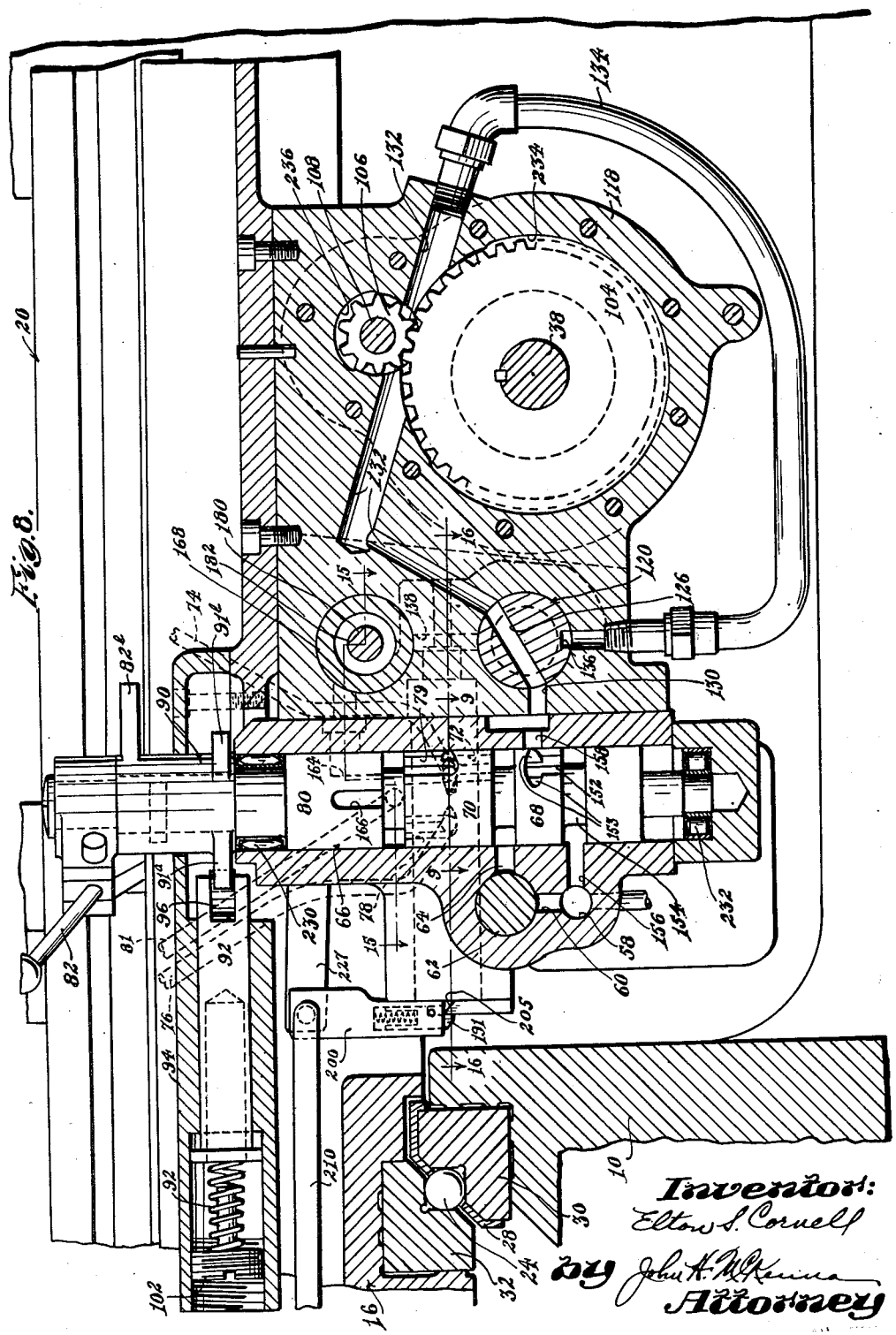

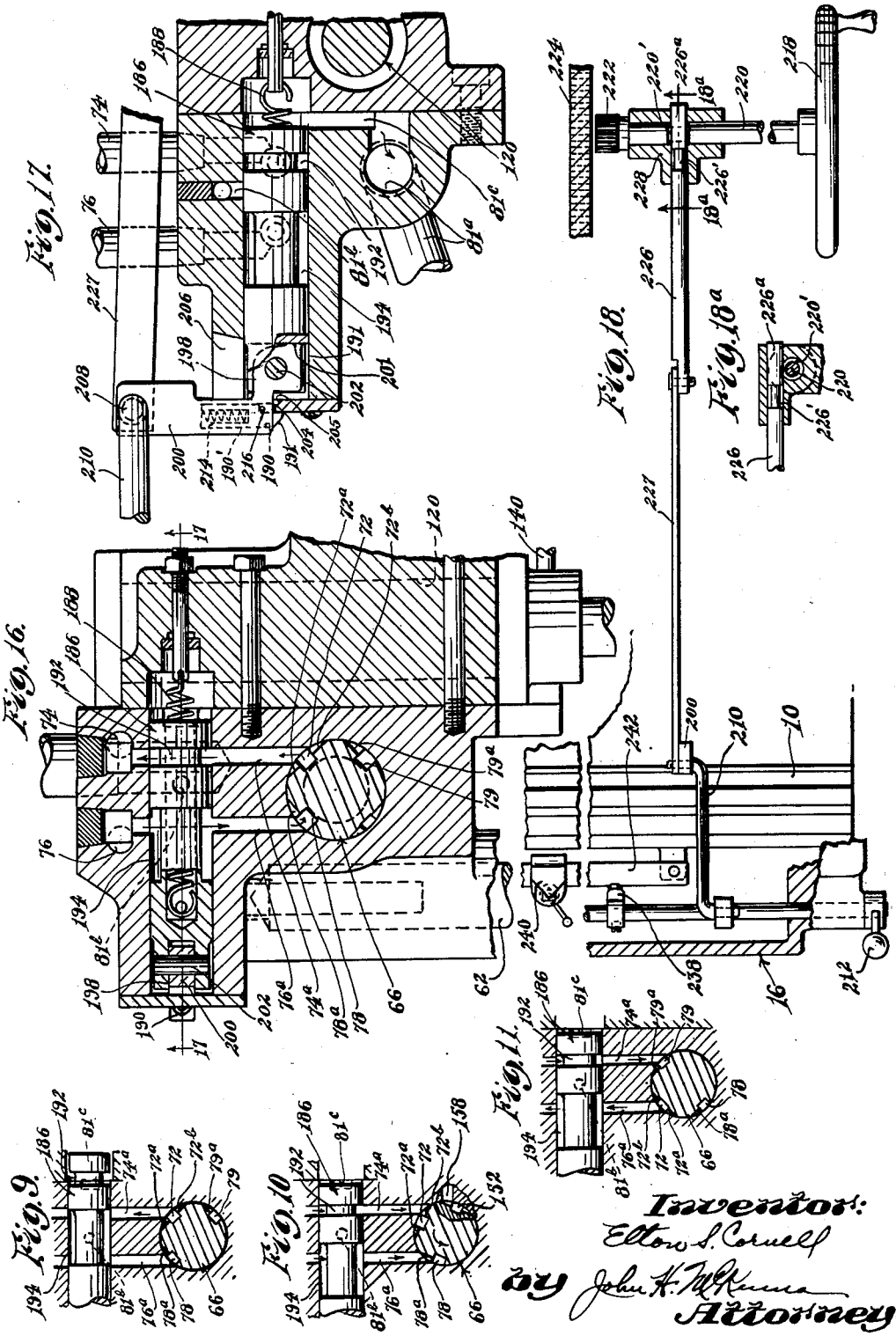

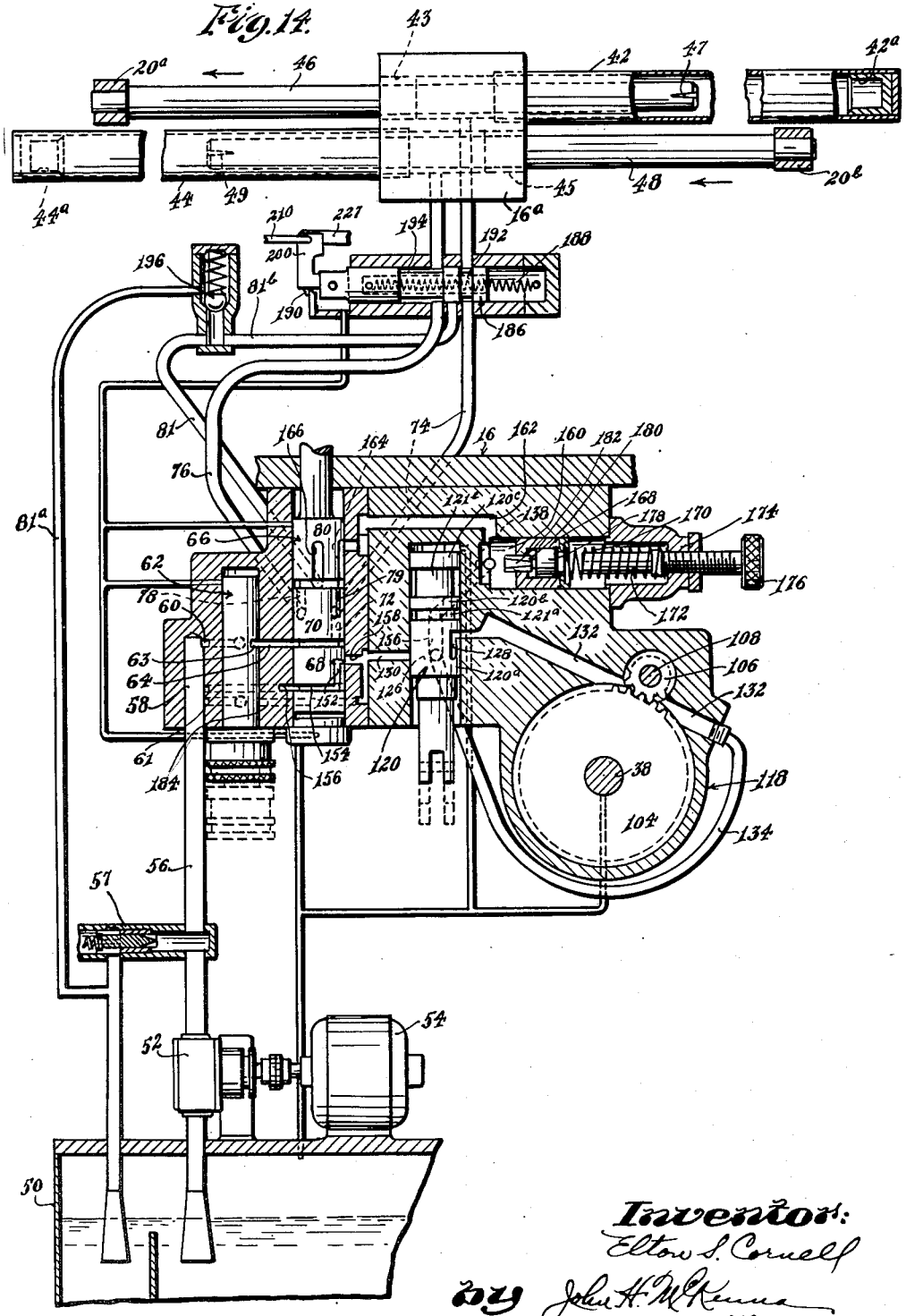

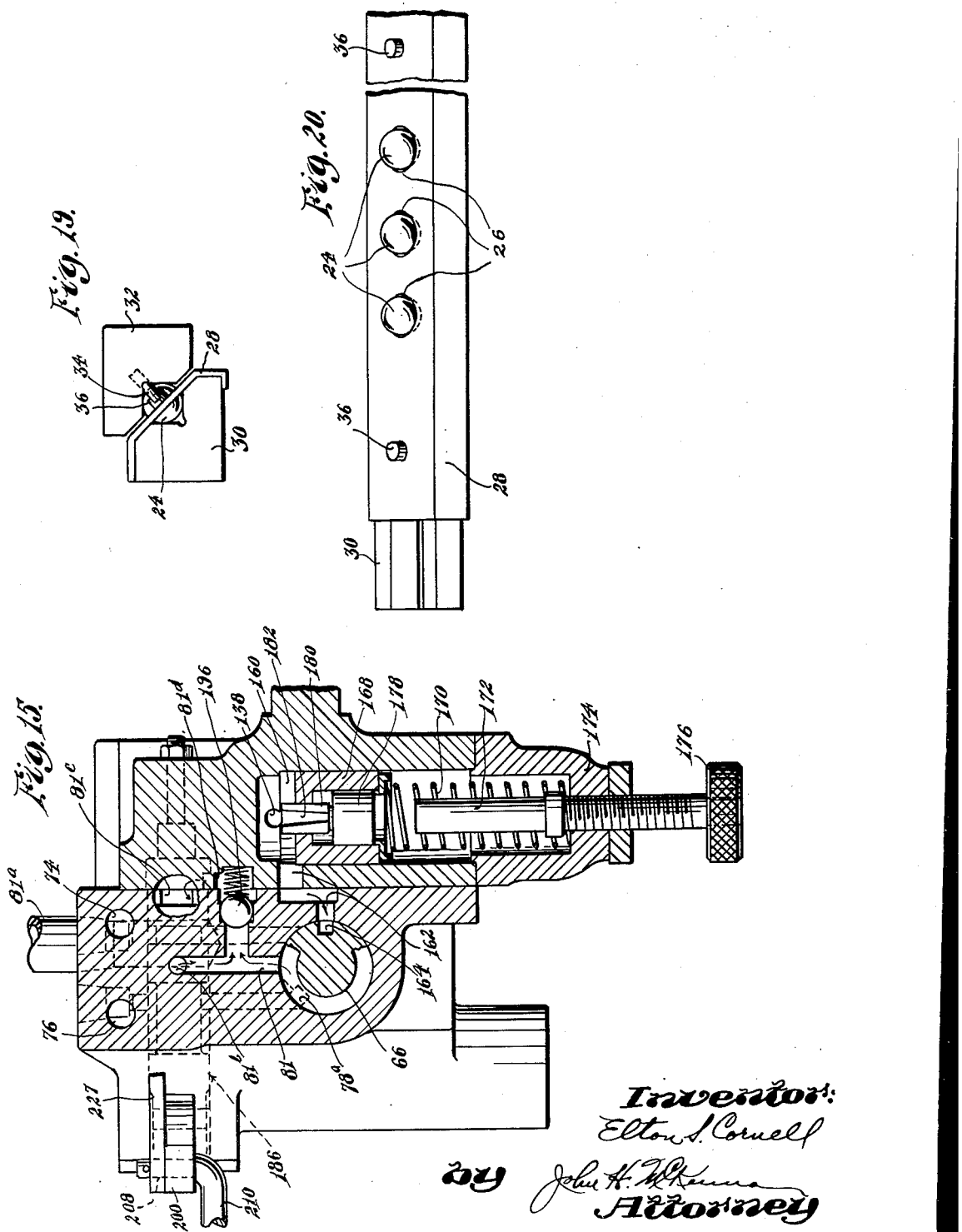

March 9, 1954  E. S. CORNELL  2,671,294
HYDRAULICALLY DRIVEN MACHINE TOOL
Filed Dec. 16, 1950  9 Sheets-Sheet 9
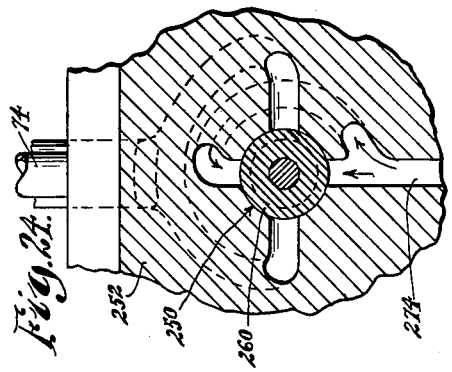
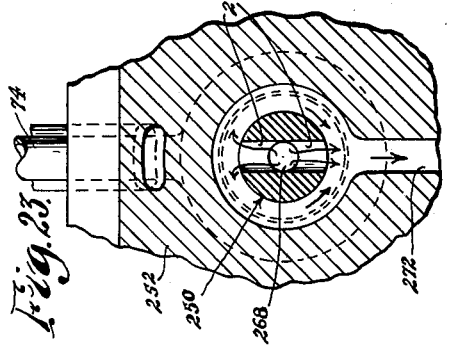
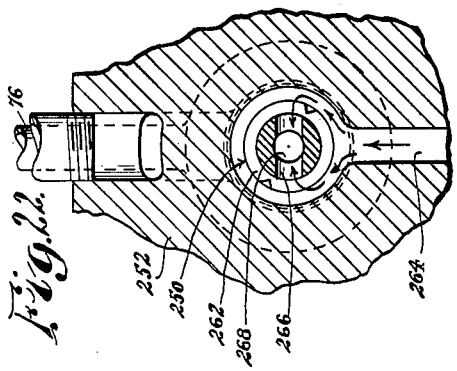
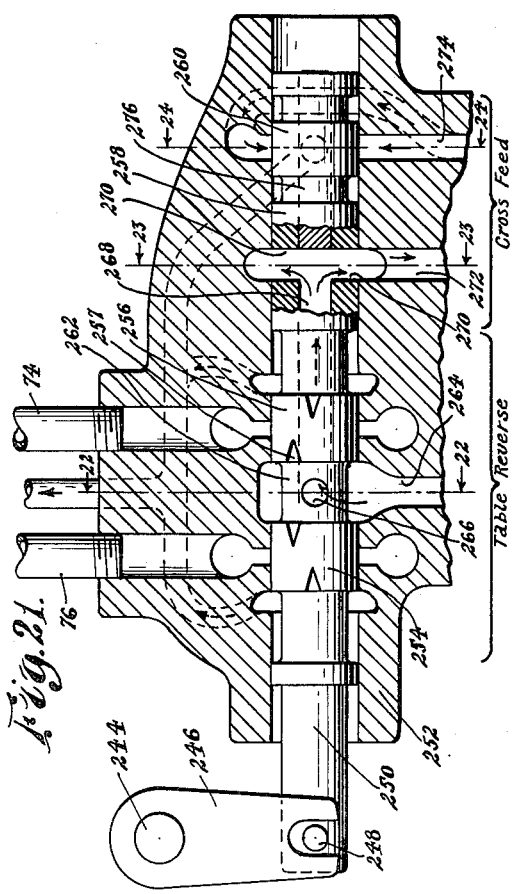
Inventor
Elton S. Cornell
by John H. McKenna
Attorney Patented Mar. 9, 1954

2,671,294

UNITED STATES PATENT OFFICE 2,671,294

HYDRAULICALLY DRIVEN MACHINE TOOL

Elton Stiles Cornell, East Providence, R. I., assignor to Abrasive Machine Tool Company, East Providence, R. I., a corporation of Rhode Island Application December 16, 1950, Serial No. 201,145

24 Claims. (Cl. 51—92)

This invention relates to improvements in machine tools of the general type which have a reciprocable work table, a tool holder, and a cross-feed slide or saddle on which either the work table or the tool holder may be mounted for movements transversely of the directions of reciprocating travel of the work table. More particularly, the invention provides an improved hydraulic system for reciprocating the work table and for operating the cross-feed slide or saddle of such machine tools, it being herein illustrated and described as it may be embodied in a surface grinding machine in which the work table is mounted on the cross-feed slide or saddle for travel transversely of the directions of reciprocating travel of the work table. A rotary grinding wheel is mounted on a tool support which is vertically adjustable toward and from the work table on a fixed supporting part of the machine, so that a work piece on the work table is carried past the rotating grinding wheel as the work table reciprocates. Cross-feed of the table-carrying slide or saddle may be selectively accomplished to provide automatic selective sized increment cross-feed in precisely timed relation to reversals of the reciprocating table or to provide continuous power cross-feed which is manually controllable for varying the speed of the cross-feed. Also, the hydraulic system may be conditioned for manual cross-feed, when desired, and an interlock is provided whereby the manual feed becomes positively locked against operation when the power feed is operable, and vice versa. The invention additionally provides improvements whereby the reciprocating movements of the work table and the transverse movements of the cross-feed slide or saddle are more effectively controlled and coordinated as compared with controls as heretofore proposed for comparable purposes. Also, a more efficient utilization of the available hydraulic power is attained in conjunction with substantial reduction of generated heat. This latter feature is of major importance where precision dimensioning of work is essential, such as in surface grinding operations where, with prior hydraulic systems, the generated heat frequently has prevented needed precision dimensioning of work.

It is among the objects of the invention to provide a machine tool of the mentioned general description wherein hydraulic reciprocation of a work table and hydraulic increment feed of a cross-feed slide or saddle are precisely and permanently properly timed so that each automatic increment of cross-feed can occur only at a predetermined exact time in each process of automatic reversal of the work table. According to the invention, a rotary table-reversing valve serves also to control the automatic increment cross-feed of the cross-feed slide or saddle, whereby the properly timed relation of the increment cross-feed to the table reversals is built into the single table-reversing valve unit and cannot become altered. The table-reversing valve precisely times the admission of pressure fluid to a cross-feed motor for increment cross-feed and also precisely times a measured exhaust from the cross-feed motor.

Another object of the invention is to provide a machine tool of the mentioned general description wherein automatic hydraulic increment cross-feed of a cross-feed slide or saddle is precisely timed with respect to reversals of a hydraulically reciprocated work table, and wherein the amount of each increment of cross-feed is determined by an adjustable control of the exhaust from a cross-feed motor. According to the invention, pressure fluid is intermittently admitted to a hydraulic cross-feed motor, but each intermittent operation of the motor, for increment cross-feed, is controlled by selecting a proper measured amount of fluid which will be permitted to exhaust from the cross-feed motor during each intermittent operation thereof, each measured amount of exhaust fluid being subsequently released while the supply of pressure fluid is cut off from the motor.

Yet another object of the invention is to provide a machine tool of the mentioned general description wherein hydraulic reciprocation of a work table is controlled by a rotary table-reversing valve which also times the increment cross-feed of a cross-feed slide or saddle, and wherein a flow-control valve is manually adjustable to vary the flow of pressure fluid to the table cylinders without reducing the flow of pressure fluid available for increment cross-feed. The invention provides for varying the speed of travel of the work table by manually adjusting a flow-control valve, but the increment cross-feed is effected by a full or maximum flow of the pressure fluid whereby a maximum amount of increment cross-feed is attained regardless of how much the table speed may be throttled.

A further object is to provide a machine tool of the mentioned general description wherein the hydraulic reciprocations of a work table are controlled by a rotary table reversing valve which, in effecting a reversal of the table, gradually restricts the exhaust from one table cylinder and simultaneously gradually restricts the pressure flow to the other table cylinder and, when the table has been brought to rest, gradually increases the pressure flow to the table cylinder which previously had been exhausting, and simultaneously gradually increases the exhaust from the other table cylinder. The invention attains faster reversals of the table, as compared with prior comparable proposals, and accomplishes each reversal without shock. The table-reversing valve has three longitudinal surface grooves for registering with conduits leading to the table cylinders, and each surface groove has a peripheral surface groove or nozzle of gradually diminishing area extending laterally therefrom at at least one side of each longitudinal groove. Hence, as a longitudinal surface groove is moving toward or from registration with a cylinder conduit, its peripheral surface groove acts to gradually increase or decrease the fluid flow to or from the longitudinal surface groove. By thus simultaneously gradually restricting both inflow to and exhaust from the table cylinders to effect deceleration and stopping of table travel in one direction, and then gradually increasing both inflow and exhaust for starting and accelerating the table in the opposite direction, a substantially faster table reversal is effected without shock.

Still another object is to provide a machine tool of the mentioned general description wherein hydraulic reciprocations of a work table are controlled by a table-reversing valve which also serves to control automatic increment cross-feed of a cross-feed slide or saddle in precisely and permanently timed relation to the table reversals, and wherein the said valve is positively oscillated by table dogs whose positions on the table determine the points in table travel at which the valve will be operated regardless of variations in the speed of travel of the table. According to the invention, the table-reversing valve has a lever on one end disposed to be engaged and rocked by suitably positioned table dogs, whereby the valve is rotated at the same reversing points in table travel whether the travel is fast or slow. Provision for an exact reversing point, unaffected by changes in table speed, is a decided advantage in a tool room surface grinder, and in cases where grinding must proceed close to an obstruction.

Another object is to provide a machine tool of the mentioned general description wherein a work table is hydraulically reciprocated, and a cross-feed slide or saddle may be hydraulically driven either for continuous or increment cross-feed, and wherein a start and stop valve is both manually and automatically operable to stop both the reciprocating travel of the table and the cross-feed with a minimum of generated heat. The start and stop valve, when in stop position, opens a by-pass from the fluid pump to the fluid supply reservoir, as distinguished from customary procedures which plug the pressure flow at all working points, causing pressure fluid to escape to the supply reservoir through one or more relief valves, with substantial generation of heat.

Another object is to provide a machine tool of the mentioned general description wherein a work table is hydraulically reciprocated and has provision also for manual operation, and wherein a start and stop valve, when in its running position, positively interlocks the manual means against operative engagement, and the manual means, when engaged, positively interlocks the valve against movement to its running positions.

Yet another object is to provide a machine tool of the mentioned general description wherein a work table is hydraulically reciprocated and a cross-feed slide or saddle may be hydraulically operated for either continuous or increment cross-feed and also may be manually operated, and wherein a relatively short cross-feed direction control valve has one position for automatic cross-feed in one direction, another position for automatic cross-feed in the opposite direction, and a neutral position in which the inlet and exhaust of the cross-feed motor are connected together for manual operation of the cross-feed, there being a positive interlock whereby the manual means is locked against operative engagement excepting when the cross-feed directional control valve is in its neutral position, and a positive interlock whereby the power feed is rendered inoperative whenever the manual feed means is in operative engagement.

It is, moreover, my purpose and object generally to improve the structure and efficiency of hydraulically driven machine tools.

In the accompanying drawings:

Fig. 1 is a front elevation of a surface grinding machine embodying features of the invention;

Fig. 2 is a front elevation of the machine of Fig. 1 on a larger scale, the base and grinding wheel supporting column being broken away;

Fig. 3 is a cross-sectional view on line 3—3 of Fig. 2;

Fig. 4 is a cross-sectional view on line 4—4 of Fig. 2;

Fig. 5 is a cross-sectional view on line 5—5 of Fig. 4;

Fig. 6 is a cross-sectional view on line 6—6 of Fig. 4;

Fig. 7 is a cross-sectional view on line 7—7 of Fig. 5;

Fig. 8 is a cross-sectional view on line 8—8 of Fig. 4;

Figs. 9–11 are cross-sectional views on line 9—9 of Fig. 8 showing the table-reversing valve in three different positions and showing the start and stop valve in two different positions;

Fig. 12 is a fragmentary top plan view of the actuating lever on the upper end of the table-reversing valve;

Fig. 13 is a fragmentary top plan view, in section on line 13—13 of Fig. 2, showing the adjustable load and fire mechanism for increasing the speed of operations of the table-reversing valve in response to table-dog-engagements of its actuating lever;

Fig. 14 is a diagrammatic representation of the hydraulic system of the machine;

Fig. 15 is a cross-sectional view on line 15—15 of Fig. 8.

Fig. 16 is a cross-sectional view on line 16—16 of Fig. 8;

Fig. 17 is a cross-sectional view on line 17—17 of Fig. 16;

Fig. 18 is a top plan view of the control means for the start and stop valve, and for the table interlock, which is shown with bearing parts in cross-section;

Figs. 18a is a cross-sectional view on line 18a—18a of Fig. 18;

Fig. 19 is an end elevation of one pair of ball race bars with the balls and a ball retainer member operatively mounted therebetween;

Fig. 20 is a side elevation of one of the race bars, with the retainer member and balls operatively associated therewith;

Fig. 21 illustrates a modified form of table-reversing valve which is axially slidable for controlling table travel and cross-feed of the cross-feed slide or saddle; and Figs. 22–24 are cross-sectional views respectively on lines 22—22, 23—23, and 24—24, of Fig. 21.

Referring to the drawings, the surface grinding machine as therein illustrated has a base 10 with the rear portion thereof extending upward a substantial distance beyond the forward portion to provide a column 12 on which the grinding wheel 14 is supported for rotation on a horizontal axis. A cross-feed slide or saddle is indicated generally at 16, mounted on the forward part of the base 10 for movements toward and from the column 12. The cross-feed saddle 16 has the V-ways 18 therein crossing the directions of its travel toward and from the column 12, and a work table 20 is mounted on the cross-feed saddle 16 for movements along the V-ways 18. The grinding wheel 14 may be driven in any conventional manner, and may be raised and lowered by any conventional means which may include the hand wheel 22.

The cross-feed saddle 16 preferably is mounted on ball-bearings 24, a series of which are rotatably retained in spaced circular holes 26 in each of two retainer members 28 which latter serve as dust covers for the ways along which saddle 16 is movable. One of the retainer members 28, with balls 24 therein, extends along each end of the forward part of the base 10 with its balls engaging between right-angularly grooved race-way bars 30, 32, secured in any suitable manner respectively on the base 10 and on the under side of saddle 16. The retainer members 28 and the balls 24 are free to move longitudinally relative to the race-way bars 30, 32 within limits which are determined by abutments 34 against which the stop pins 36 on the retainer members engage at the opposite limits of travel of the retainer members. A cross-feed screw 38 is rotatably anchored on the saddle 16 and threadedly engages a fixed nut 40 on the base 10, whereby the saddle may be fed in either direction along the race-way bars 30 by rotating the cross-feed screw 38 in the proper direction.

According to the invention, the work table 20 is hydraulically reciprocated on the ways 18 of the saddle 16 and there is provision for coordinated hydraulic increment feed of the saddle 16 along the race-way strips 30 on base 10, as well as for continuous cross-feed of saddle 16 either hydraulically or manually.

Referring more particularly to Figs. 3 and 14, two cylinders 42, 44 are rigidly mounted in the part 16a of the saddle 16, and two rams 46, 48 are rigidly connected respectively to brackets 20a, 20b which are rigid on opposite end portions of the table 20. The rams extend in opposite directions into the respective cylinders, ram 46 entering cylinder 42 and ram 48 entering cylinder 44, with a suitable packing means 43 and 45 tightly but slidably engaging around the rams.

Oil under pressure may be supplied to either one of the cylinders 42, 44, and when one is being supplied with oil under pressure, the other will be open for escape of oil therefrom. The oil is drawn from an oil reservoir 50 in base 10 by means of a suitable pump 52 which may be driven by an electric motor 54. Preferably, a constant displacement pump 52 is employed to ensure that a maximum cross-feed may be had regardless of how slow the table may be operating.

In the diagrammatic showing of Fig. 14, the arrows indicate that the rams 46, 48 are moving to the left, for moving the work table 20 to the left. Oil under pressure is delivering into cylinder 42 and oil is exhausting from cylinder 44. However, before oil under pressure reaches cylinder 42, it is delivered from the pump 52, through pipe 56 to a conduit 58 whence it passes through conduit 60 to a flow-control valve 62 which is rotatable and also slidable between two operative positions. When valve 62 is in its position of Figs. 4–6 and 14, oil under pressure passes through conduit 64 from flow-control valve 62 to a generally vertically disposed rotary table-reversing valve indicated generally at 66. Groove 63 of valve 62 is in register with conduit 60 and conduit 64. Pressure oil from conduit 64 delivers between spools 68, 70 of table-reversing valve 66 and enters the groove 72 which is shown dotted at the far side of the spool 70, in Figs. 8 and 14, in register with a conduit 74 leading to the cylinder 42. Fig. 10 shows groove 72 just leaving registration with cylinder conduit 74a. By manually rotating valve 62 in its position of Figs. 4–6, the amount of pressure fluid passing to reversing valve 66 may be controlled thereby to vary the speed of reciprocating travel of work table 20.

A similar conduit 76 extends between spool 70 and the cylinder 44, it being shown in Figs. 8 and 14, in register with a groove 78 which is shown dotted at the far side of spool 70. Fig. 10 shows this groove 78 just leaving registration with cylinder conduit 76. Groove 78 opens into an annular space between spool 70 and an adjacent spool 80 of table-reversing valve 66. Hence, oil exhausting from cylinder 44 delivers between spools 70, 80, and a main exhaust conduit 81 is constantly connected to this space between spools 70, 80, through which exhaust oil from cylinder 44 delivers into return conduit 81a leading back to reservoir 50.

Actually, spool 70 has two similar diametrically opposite grooves for handling exhaust oil from the cylinders 42, 44, the groove 78 handling exhaust from cylinder 44, as above explained, and a groove 79 handling exhaust from cylinder 42, in a similar manner when the table-reversing valve 66 is rotated through 90° from its position of Figs. 4–6, 8 and 14, to bring groove 79 into register with the cylinder conduit 74. Figs. 9–11 show the table-reversing valve 66 in cross-section on line 9—9 of Fig. 8. Fig. 9 shows the positions of the grooves 72, 78 and 79 relative to the cylinder conduits 74, 76 when the valve is in its position for table movement to the left in Figs. 2 and 14. Fig. 10 shows the valve rotated slightly counter-clockwise from its position of Fig. 9 as when the table is decelerating. Fig. 11 shows the valve rotated 90° counter-clockwise from its position of Fig. 9 for movement of the table to the right in Figs. 2 and 14.

Referring to the cross-sectional views of the table-reversing valve 66, as seen in Figs. 9–11, a feature of importance resides in the provision for gradual restriction of both the inlet and the exhaust as the valve rotates to stop travel of the work table 20 in either direction. The single groove 72 for handling pressure oil has the oppositely disposed shallower grooves 72a and 72b extending laterally from groove 72 at the opposite sides thereof, and each groove 78, 79 has a similar lateral groove 78a, 19a extending from it, at that side which is toward the groove 72. Hence, as the table-reversing valve 66 is rotated in either direction, the lateral grooves coact with the main grooves 72, 78 and 79 to effect a gradual restricting or throttling of both the pressure oil going to one cylinder 42 or 44 and the exhaust oil coming from the other cylinder. This provides a cushioned deceleration, avoids hydraulic hammer, and ensures that acceleration will be slow and smooth notwithstanding the rapidity of movement of valve 66. Balancing grooves preferably are provided opposite the grooves 72, 72a and 72b, as shown in Fig. 16, for equalizing lateral thrust, they being omitted in Figs. 9–11.

In the event that the table dogs do not stop the travel of the table, for any reason, the table will be gently stopped at either extremity of travel by coaction of a relatively short chamber 42a or 44a at the outer end of each cylinder 42, 44, whose walls closely receive the end portion of a ram 46 or 48 during the final travel of the ram, and the end surface portions of the rams have longitudinal tapering grooves 47, 49 therein for restricted escape of oil becoming trapped in the end chambers 42a, 44a. The final travel of the rams is thereby effectively cushioned and the rams brought to rest before a ram can strike the end of a cylinder.

Table-reversing valve 66 is rotatably mounted in a valve casing on the cross-slide saddle 16 with its axis vertical, and with its upper end projecting above the saddle and equipped with an actuating lever indicated generally at 82. Lever 82 has a handle 84 thereon by which the table-reversing valve 66 may be manually rotated. However, projections 82a, 82b on lever 82 intermittently are in position to be engaged by the table dogs 86 which may be selectively positioned along the slots 88 in table 20. When the table is moving in one direction, one of the dogs 86 ultimately will engage a lever projection 82a or 82b and move it to automatically rotate table-reversing valve 66 in direction to effect deceleration and reversal of the table as earlier described.

According to the invention, each reversing actuation of the table-reversing valve 66 is accomplished on a load-and-fire principle which provides extremely rapid actuations of the valve. As best seen in Fig. 13, a cam member 90 is fixed on the upper end portion of valve 66, below the actuating lever 82. A plunger 92 is slidably mounted in a housing 94 which encloses cam member 90, and the plunger has a roller 96 at one end constantly held against cam member 90 by the relatively long coil spring 98. One end of the spring 98 is seated deep within a chamber 100 in plunger 92 and its other end is engaged by an adjustable plug 102 which may be adjusted in housing 94 to vary the resilient pressure holding roller 96 against cam member 90. The cam member has a generally heart shape, including the two similar cam portions 90a, 90b, and the two abutment portions 91a, 91b. Assuming that table 20 is moving to the left in Fig. 2, the right-hand table dog 86 ultimately will engage the lever projection 82a, as best seen in Fig. 12, and will rotate the lever and valve 66 counter-clockwise in Fig. 12. When this counter-clockwise movement of valve 66 proceeds to a stage where the peak 90c of cam member 90 (Fig. 13) passes the center line of plunger 92, the spring 98 will have been compressed or loaded and its recoil action will drive plunger 92 toward the cam member, causing the latter to rapidly rotate until the abutment portion 91b stops against the roller 96. This load-and-fire action in the reversing actuations of valve 66 greatly increases the speed of reversals of the table, and the speed of the recoil travel of the plunger may be varied by adjusting plug 102. However, the main advantages, as compared with pilot operated reverse valves, are that the table can reverse at the same point at any given table speed, and the point of reversal does not vary with changes of table speed.

A feature of importance is that the same table-reversing valve 66 which controls the flow of oil to and from the cylinder 42, 44 also controls the operation of a gear motor which effects cross-feed of the saddle 16. This ensures that the table travel and the automatic cross-fed always must be in properly timed relation during automatic increment cross-feed.

The cross-feed motor comprises a relatively large gear 104 which is fixed on the outer end of the cross-feed screw 38 which is rotatably fixed at the under side of saddle 16. The cross-feed screw threadedly engages the fixed nut 40 on base 10, whereby rotation of the screw effects cross-travel of the saddle 16 on base 10. A smaller gear 106 meshes with gear 104, it being fixed on a shaft 108 whose outer end is equipped with one element 110 of a clutch whose other element 112 is on the end of a short shaft 114 which is slidably mounted in the apron 17 of saddle 16. The outer end of shaft 114 has hand wheel 116 thereon by which the clutch element 112 may be thrust inward to engage clutch element 110, after which the cross-feed screw 38 may be manually rotated by rotating the hand wheel 116. However, an interlock, later to be described, locks hand wheel 116 against clutch engagement whenever the gear motor is connected for receiving pressure fluid.

The motor gears 104 and 106 are closely confined wtihin a motor housing 118 on the under side of saddle 16, behind the apron 17. A cross-feed directional valve 120 is slidably mounted in housing 122 and has its forward end projecting through apron 17 and connected to an operating lever 124. This valve 120 has one relatively long spool part 120a, a relatively short spool part 120b slightly spaced from part 120a to provide the annular groove 121a between these parts, and a relatively short part 120c substantially spaced inward from part 120b to provide the relatively long annular groove 121b between parts 120b and 120c. The longer spool part 120a has a hole 126 extending diagonally through it and opening into a surface groove 128 therein. When the valve is in its innermost position of Fig. 4, one end of the diagonal hole 126 is in register with a conduit 130 leading from table-reversing valve 66, and the surface groove 128 is in register with a conduit 132 in the motor casing which leads to the region of meshing of the motor gears 104, 106 and continues at the other side of the meshing gears, opening through the motor casing 118. However, a tube or pipe 134 is connected to the conduit 132 where it opens out of the casing, for conducting oil exhausting from the gear motor back to the cross-feed directional valve 120 which has a surface groove 136 in register with the pipe conduit and opening into the annular groove 121a between the valve parts 120a, 120b. An exhaust conduit 138 also is in register with annular groove 121a. Hence, when table-reversing valve 66 is in a position to pass pressure oil to the cross-feed directional valve 120, assuming the latter valve to be in its innermost position, the pressure oil enters and operates the gear motor to rotate the cross-feed screw 38, with the exhaust from the motor passing back through the directional valve 120 into exhaust conduit 138 whence it goes to a measuring means later to be described.

Reversal of the gear motor is effected by manual actuation of operating lever 124 in direction to shift the directional valve 120 to a forward position in which the annular groove 121a registers with the conduit 130 leading from table-reversing valve 66. At the same time the longer annular groove 121b of valve 120 will be in register with the conduit 132 and with the exhaust conduit 138. When valve 120 is in an intermediate neutral position, with groove 121a in register with conduit 132, conduit 130 will be closed and motor conduits 132, 134 will be connected together by annular groove 121a and surface groove 136, permitting free bi-lateral flow for manual operation of the cross-feed screw 38 by means of hand wheel 116.

As best seen in Fig. 4, an interlock is provided whereby the clutch elements 110, 112, for manual cross-feed, can be engaged only when the cross-feed directional valve 120 is in its neutral position. A locking pin 140 has one end slidably engaged in a hole 142 in the outer end portion of the casing for valve 120, and has its other end slidably engaged in a hole 144 in a wall of a chamber 146 within which the clutch element 112 normally is retracted. The end of pin 140 which is in hole 142 has conical shape as at 140a and rests against the forwardly extending shank of valve 120 when the latter is in its innermost position of Fig. 4 and also when it is in its outermost position. However, the valve shank has a conical depression 148 therein which comes opposite the pin 140 when the valve is in its intermediate neutral position, so that the conical end of the pin can enter this conical depression 148. At its other end, pin 140 is tapered, as at 140b, and clutch element 112 has an annular groove 150 therein with correspondingly tapering walls. The pin 140 has length such that, when the conical end 140a thereof is in engagement with the periphery of the shank of valve 120, as in Fig. 4, the tapered end 140b thereof will be projected into groove 150 of clutch element 112 preventing inward movement of clutch element 112 into engagement with clutch element 110. But, when the depression 148 comes opposite the pin 140, the pin can slide enough to disengage its tapered end from the groove 150 of clutch element 112, after which the clutch may be engaged. Pin 140 has an inclined position, as shown dotted in Fig. 2, whereby gravity tends to hold its lower conical end in engagement with the shank of directional valve 120, and the coaction of the conical surfaces of the pin and depression 148 cam the pin to its interlocking position of Fig. 4 when the valve 120 is shifted in either direction from its neutral position. If pin 140 for any reason fails to drop into depression 148 when the depression comes opposite the pin, coaction of the tapering surfaces of the pin and the walls of groove 150 of clutch element 112 will cam the pin downward when inward thrust is applied to hand wheel 116.

Operation of the gear motor for intermittent cross-feed of saddle 16 occurs during rotation of table-reversing valve 66 preparatory to reversal of the direction of travel of the work table 20. As herein represented, the table-reversing valve rotates through substantially 90° in effecting deceleration and reversal of the table. The intermittent cross-feed occurs during approximately 95% of the period of table deceleration when the table is being driven at one-half its maximum speed. If the table is being driven at maximum speed, the maximum cross-feed will occur during approximately 95% of the period of table deceleration and also during the greater part of the period of table acceleration, which may be approximately 95% of the acceleration period when the load and friction are relatively large. For this purpose, the spool 68 of valve 66 has a surface groove 152 therein open into an annular groove 154 in valve 66. Annular groove 154 is constantly in register with a conduit 156 which leads from conduit 58 into which the pump output from pipe 56 delivers. Surface groove 152 is adapted to register with a conduit 158 in the valve casing, and the conduit 158 is in constant register with conduit 130 leading to the cross-feed directional valve 120.

When the work table 20 is reciprocating, the gear motor 104, 106 will be operated intermittently to rotate the cross-feed screw 38, for increment cross-feed of the saddle 16, in one direction or the other depending upon the position of the directional valve 120. This intermittent increment cross-feed of saddle 16 necessarily can occur only when the surface groove 152 of table-reversing valve 66 comes into register with conduit 158 which can happen only during the time when the table 20 is reversing, and the properly timed relation of the ports for table travel and for cross-feed is permanently fixed for the life of the machine because of the integral block structure within which reversing valve 66 operates. However, groove 152 has the lateral peripheral surface extensions 153 for gradual increase and decrease of the pressure flow into conduit 158 when valve 66 is in the process of reversing table 20. These groove extensions 153 may be omitted under certain conditions of operating pressures.

It is important to note that, while the flow of fluid for reciprocating table 20 may be manually controlled by rotating flow-control valve 62, thereby to vary the speed of travel of table 20, the full volume of the pumped fluid continues available for the intermittent cross-feed regardless of how much the table may be throttled. This will be apparent from a consideration of Figs. 5 and 6 wherein it may be seen that conduit 156 constantly is open between supply conduit 58 and annular groove 154 of table-reversing valve 66, so that incoming fluid, under full pressure, constantly stands ready in surface groove 152 to enter conduit 158 and pass thence through conduit 130 to cross-feed directional valve 120 whenever surface groove 152 comes into register with conduit 158.

It is a feature of primary importance that the critical control of the increment cross-feed is attained by a predetermined and adjustable measured exhaust from the cross-feed motor 104, 106 as distinguished from prior proposals which control increment cross-feed by controlling the input of pressure fluid to a cross-feed motor or the like.

According to my present invention, and referring to Figs. 8 and 15, the exhaust from cross-feed motor 104, 106 goes through conduit or pipe 134 to the cross-feed directional valve 120. When the latter valve is in its position of Fig. 8, the exhaust passes through valve surface groove 136 into annular groove 121a (Fig. 4) when it enters exhaust conduit 138 (Figs. 8, 15). Exhaust conduit 138 opens into the inner end of a cylinder 160 which is located adjacent to spool 80 of the table-reversing valve 66, and an outlet conduit 162 from the cylinder leads to the spool 80 of table-reversing valve 66. Spool 80 of valve 66 has two longitudinal surface grooves 164, 166 disposed 90° apart on the spool and these grooves 164, 166 (Figs. 8, 15) are positioned to be out of register with cylinder outlet conduit 162 when pressure fluid is admitted to the cross-feed motor for increment cross-feed. Hence, when the cross-feed motor is exhausting, the outlet conduit 162 from cylinder 160 is closed. As a result, the exhaust from the cross-feed motor accumulates in cylinder 160 which has a measuring piston 168 therein backed by a coil spring 170. As the exhaust fluid accumulates in cylinder 160, it forces piston 168 outward in the cylinder until the piston is stopped by an adjustable abutment 172. The abutment, as shown, is a pin having an outer portion threadedly engaged in a housing part 174 which projects outward through an opening in the apron 17 of cross-slide saddle 16. The outer threaded portion of the abutment projects outward substantially beyond the housing part 174 and has a finger knob 176 on its outer end by which the abutment may be manually adjusted to selectively determine the permissible amount of travel of piston 168 in cylinder 160, thereby to predetermine a measured amount of exhaust fluid which can enter cylinder 160.

It will be apparent from the foregoing description, in connection with Fig. 15, that exhaust fluid from the cross-feed motor, during an intermittent operation of the motor, will force the piston 168 outward until it is stopped by abutment 172 at which time operation of the motor must stop. Meanwhile spring 170 will have been compressed and loaded for driving the measured quantity of exhaust fluid from cylinder 160 as soon as table-reversing valve 66 shifts to bring a groove 164 or 166 into register with cylinder outlet conduit 162, each of the grooves 164, 166 opening into the annular valve groove between spools 70 and 80 from which the main exhaust conduit 81a for the table-reversing valve 66 leads.

Preferably, a shock-absorbing means is provided for the measuring piston 168. As represented, this comprises a plunger 178 operable within the piston 168 and having a stem 180 extending slidably through the inner end wall of the piston. The stem 180 has a tapering flat portion 182 on its cylindrical surface to provide a restricted passage through the inner end wall of the piston through which exhaust fluid can enter within the piston to force the plunger to its outermost position within the piston. Hence, when exhaust fluid initially enters cylinder 160, the plunger will be forced to its outermost position within the piston as the piston is forced outward in cylinder 160, and it is the plunger 178 that engages abutment 172 to provide a hydraulic cushion for the final outward travel of piston 168, due to the gradually diminishing outlet for fluid which is being forced from within the piston. Similarly, when spring 170 drives piston 168 inward, the stem 180 of plunger 178 first engages the end wall of cylinder 160 and the plunger yields hydraulically within the piston to cushion the final movement of the piston.

When the flow control valve 62 is in its innermost position of Figs. 4–6 and 14, the system will be conditioned for reciprocation of table 20 and for permanently accurately timed intermittent increment cross-feed of slide or saddle 16, assuming that cross-feed reversing valve 120 is in either its innermost or outermost positions. The speed of travel of table 20, as earlier explained, may be manually controlled by rotating flow-control valve 62.

However, the invention provides for attaining continuous cross-feed when table 20 is at rest, and for manually controlling the continuous cross-feed to provide rapid continuous traverse and, selectively, slower continuous traverse suitable for truing operations on the grinding wheel 14. By one's pulling flow-control valve 62 to its outermost position, its tapering circumferential groove 63 is brought into register with a conduit 61 leading to the valve 62 from inlet chamber 58, and with a conduit 184 which, as best seen in Fig. 4, by-passes the table-reversing valve 66 and connects with conduit 130 leading to cross-feed reversing valve 120. Hence, in the outermost position of valve 62, pressure fluid passes through reversing valve 120 to gear motor 104, 106 and the full volume of the driving fluid is available for continuous rapid cross-feed, although the speed of the continuous cross-feed may be manually controlled by rotating valve 62 in its outermost position. It is important to note, however, that valve 62 cuts off fluid flow to table-reversing valve 66 whenever valve 62 is in its outermost position, thereby ensuring that work table 20 will be at rest before any continuous cross-feed of slide or saddle 16 can be effected.

In addition to the various valves earlier described for controlling the flow of pressure and exhaust oil, or other fluid, a start and stop valve, indicated generally at 186, intervenes between table-reversing valve 66 and the table cylinders 42, 44 and is operable for controlling fluid flow to and from the table cylinders. As best seen in Figs. 16, 17, valve 186 is longitudinally slidable between start and stop positions and is constantly biased to its stop position by the coil spring 188. In Fig. 16, the valve 186 is shown positioned across the conduits 74a, 76a which lead between the table-reversing valve 66 and the cylinder conduits 74, 76 respectively. It is in its moved-to-the-left "start" position, held by the latch member 190, as best seen in Fig. 17. In this "start" position of valve 186, an annular groove 192 of the valve registers with conduit 74a and with the entrance to cylinder conduit 74. The other end of conduit 74a is in register with surface groove 72 of table-reversing valve 66, whereby fluid under pressure passes through valves 66, 186 to the table cylinder 42. Another wider annular groove 194 of valve 186 is in register with conduit 76a and with the entrance to cylinder conduit 76, while the other end of conduit 76a is in register with exhaust surface groove 78 of table-reversing valve 66. Hence, as pressure fluid enters table cylinder 42, the table cylinder 44 is open to exhaust. When table-reversing valve 66 is rotated counterclockwise in Fig. 16, to its position of Fig. 11, the surface groove 72 is brought into register with conduit 76a and the exhaust surface conduit 79 is brought into register with conduit 74a, whereby table cylinder 44 is supplied with pressure fluid while table cylinder 42 is open to exhaust. Fig. 9 shows valve 186 released and pulled by its spring 188 to its "stop" position in which its wider annular groove 194 is in register with both of the conduits 74a, 76a. As herein disclosed, annular groove 194 is in register also with an exhaust conduit 81b (Figs. 15, 16, 17) which is a branch of exhaust conduit 81 leading from the annular groove between spools 70, 80 of table-reversing valve 66. Exhaust fluid in exhaust conduits 81, 81b must pass through a check valve 196 (Figs. 14 and 15) before reaching the main exhaust return conduit 81a, and this check valve 196 is designed and set to provide a relatively small back-pressure in the hydraulic system, such as five pounds, for example. Referring to Figs. 15, 17, stop and start valve 186, in its latched operative position, uncovers the exhaust conduit 81c so that exhaust fluid passing through check valve 196 (Fig. 16) can pass through conduit 81c and thence to main return conduit 81a. When the valve 186 is released and moves to its "stop" position of Fig. 9, the annular groove 192 uncovers exhaust conduit 81c and conduit 81d, so that exhaust passing through the check valve from conduit 81b can escape into the main return conduit 81a. However, the exhaust conduit 81b may be omitted, when desired, inasmuch as oil from annular groove 194 of valve 186, when the valve is in its "stop" position, can go through either conduit 74a or 76a to the reversing valve and thence through the low pressure valve 196 to the supply tank 50 with only slight tendency to generate heat. When valve 186 is in its "stop" position, the wider valve groove 194 connects conduits 74, 76 to each other thereby conditioning the system for manual feed of table 20 by hand wheel 128, without need for releasing each ram to avoid the hydraulic lock which otherwise would result. An important feature is that heat generation is greatly minimized as a result of stopping table travel by connecting together the table cylinders with only a low pressure connection between the cylinders and the oil supply tank 50, as compared with the prior proposals which stop the table travel by cutting off the oil supply to the table cylinders and requiring the pressure oil to force its way back to the supply tank through a high pressure relief valve. Also, according to the present disclosure, groove 194 of valve 186 connects each table cylinder to the light back pressure maintained by relief valve 196 to ensure replenishing of any leaks from the table cylinders.

Start and stop valve 186 has its left-hand end bifurcated at 198 and the latch 190 is slidably mounted in a latch lever 200 which is pivotally mounted at 202 between the furcations of the valve, as best seen in Fig. 17. The lever has a portion extending from its pivot outwardly through the end wall of the valve housing and extends integrally upward, with its upper end pivotally connected at 208 to one end of an actuating rod 210 whose other end is connected to a control lever 212 (Fig. 1) by which the stop and start valve 186 may be manually controlled. The upper wall portion of the valve housing is notched at 206.

Latch 190 is slidably mounted in the vertical portion of lever 200, being constantly biased downwardly by a backing spring 214. A stop pin 216 extends transversely of the lever, and latch 190 has a shoulder 190' adapted to engage pin 216 to limit downward travel of the latch. The inner surface of the end wall of the valve housing, adjacent to latch 190, is bevelled at 205, and the outer portion of the lower end of latch 190 is bevelled at 191 (Figs. 8 and 17), whereby the latch is cammed upwardly when the bevelled surfaces 205, 191 engage each other during outward movement of the valve, and spring 214 snaps latch 190 to latching position as soon as the latch passes the housing end wall in its outward travel.

When latch lever 200 is in its vertical position of Fig. 17, its toe part 201, coacting with the latch, prevents any counter-clockwise movement of the lever about pivot 202, but an actuation of actuating rod 210 to the right in Fig. 17 will rock lever 200 clockwise about pivot 202 until latch 190 can slip through the housing end wall under the bias of valve spring 188 which shifts the valve to the right to its "stop" position of Fig. 9. This latch-releasing movement of actuating rod 210 may be in response to a manual actuation of control lever 212 or may be automatic in response to coaction of lever 238 and adjustable dogs on a dog rail which is mounted at the left-hand side of the base 10, as later described herein.

In conjunction with the described control of start and stop valve 186, the invention provides a positive interlock against manual longitudinal feed of work table 20 excepting when valve 186 is in its stop position. The usual hand wheel 218 (Figs. 1, 18) for manual longitudinal feed of table 20 is fixed on a shaft 220 on whose inner end is fixed the pinion gear 222. A usual gear rack 224 is fixed to the under side of table 20 in position to be engaged by pinion 222 when the hand wheel 218 is pressed inward.

According to the invention, an interlock bar or rod 226 has one end pivotally connected by link 227 to the upper end of the latch lever 200. Its other end portion extends slidably within the bearing part 228 for the hand wheel shaft 220. Rod 226 is annularly grooved at 226', and shaft 220 is similarly annularly grooved at 220'. When the start and stop valve 186 is in its operating position of Fig. 17, the non-grooved portion 226a is drawn to the left into the annular groove 220' of shaft 220, thereby locking the shaft against being pushed inward to engage pinion 222 with rack 224. However, as soon as valve 186 shifts to its "stop" position of Fig. 9, the two annular grooves 226' and 220' come into registration and wheel shaft 220 and pinion 222 are free to be pushed inward.

Briefly summarizing the operation, the motor 54 will be started by means of a suitable electric control (not shown), which starts pump 52. Assuming that start-stop valve 186 is in its "stop" position of Fig. 9, and that flow-control valve 62 is in its innermost position of Figs. 4, 14, the pressure fluid from conduit 56 enters chamber 58 and passes through conduit 60 to the flow-control valve 62, whence it passes through valve groove 63 and conduit 64 into the annular groove between spools 68, 70 of table-reversing valve 66. Assuming this latter valve to be in its position of Figs. 8 and 14, the pressure fluid passes through surface groove 72 and into conduit 74a (Fig. 9) whence it enters annular groove 194 of start-stop valve 186. From groove 194, it enters exhaust conduit 81b and passes thence to and through the low pressure check valve 196 (Fig. 15) and through conduits 81d, 81c to main return conduit 81a leading back to the supply reservoir 50. A safety valve is represented at 57 in Fig. 14, connected across pump conduit 56 and return conduit 81a. Hence, with start-stop valve 186 in its "stop" position, the pressure fluid returns to the reservoir 50 without any substantial generation of heat.

To start travel of table 20, hand lever 212 (Figs. 1 and 18) is actuated to draw start-stop valve 186 to the left to its latched position of Figs. 10, 11, 14–17. Pressure fluid coming to the start-stop valve 186 now enters annular groove 192 therein and passes on into table conduit 74 to table cylinder 42 for driving table 20 to the left. Simultaneously, fluid from table cylinder 44 exhausts through conduit 76 into annular groove 194 of stop-start valve 186 whence it passes through conduit 76a (Figs. 9–11 and 16) and surface groove 78 of table-reversing valve 66 into the annular groove between spools 70, 80 of the latter valve. From there it passes through conduit 81 (Fig. 15) to and through check valve 196 and on through conduits 81, 81c to the main return conduit 81a (Fig. 17).

When table 20 approaches the limit of its travel to the left, one of the table dogs 86 will engage projection 82a (Fig. 12) of lever 82, on the upper end of the table-reversing valve 66, thereby to rotate the latter valve counter-clockwise in Figs. 10, 16. The load-and-fire mechanism of Fig. 13 comes into action to move the valve through that position where the table dog no longer pushes it, the spring 98 re-acting after being compressed to quickly complete the reversing movement of the reversing valve 66, thereby getting the valve past the point of no liquid flow to and through the positions of increasing flow to the other table cylinder. This makes the reversal point a function of space instead of time, and eliminates the lag which is a characteristic of reversing valves of the pilot valve types.

However, during the rotation of the table-reversing valve 66, the cross-feed motor 104, 106 is automatically operated to provide an increment of cross-feed which starts at the beginning of table deceleration and continues through as much of the reversal period as may be required for any pre-set increment of cross-feed. For example, in the disclosed embodiment, the maximum increment of cross-feed requires all of the deceleration period and nearly all of the acceleration period when the table is being operated at a speed of 100 feet per minute while, at a table speed in the neighborhood of 50 feet per minute, the maximum increment of cross-feed is accomplished during the deceleration period alone. Referring to Figs. 5–8, pressure fluid, at full pressure, is supplied to surface groove 152 of table reversing valve 66. Hence, during the initial counter-clockwise rotation of the valve, the surface groove 152 comes into register with conduit 158 leading to conduit 130 whence the pressure fluid passes through conduit 126 of motor reversing valve 120 and thence to the gear motor 104, 106. Movement of surface groove 152 into and out of registration with conduit 158 is accompanied by gradually increasing of the volume of fluid entering conduit 158 and then gradually decreasing volume, due to the lateral tapering grooves 153, and the interval when fluid passes into conduit 158 is relatively short. But, according to the invention, it is not the incoming pressure fluid that determines the amount of cross-feed increment, but an adjustable measured quantity of fluid exhauising from the gear motor. The exhaust from the motor passes through pipe conduit 134 to cross-feed directional valve 120, delivering into surface groove 136 thereof and passing through conduit 138 into cylinder 160 (Fig. 15). However, during the initial counter-clockwise rotation of table-reversing valve 66, the surface groove 164 thereof will have moved out of registration with the outlet 162 from cylinder 160. Hence, exhaust fluid entering cylinder 160 from the gear motor is trapped therein and forces measuring piston 168 along the cylinder until it is stopped against abutment 172, at which time no further exhaust fluid can enter the cylinder, and motor 104, 106 stops regardless of whether the inlet thereto may still be open. Hence, the travel of the piston 168, which is manually adjustable by adjustment of abutment 172, predeterminates the amount of exhaust fluid that can enter cylinder 160, and this measured amount of fluid permitted to exhaust from the gear motor determines the amount of each increment of cross-feed.

While measuring piston 168 is being moved along cylinder 160 by incoming exhaust from motor 104, 106, spring 170 is compressed and conditioned for driving the piston 168 inward to drive the exhaust fluid from cylinder 160 as soon as table-reversing valve 66 reaches the limit of its counter-clockwise rotation, at which time its surface groove 166 will have come into register with the outlet conduit 162 from the cylinder. At this time also, the surface groove 152 will have passed out of registration with inlet conduit 158, so that the supply of pressure fluid is cut off from the gear motor.

The exhaust fluid driven from cylinder 160 enters surface groove 166 and passes thence into the annular groove between spools 70, 80 of table-reversing valve 66, and passes through conduit 81 (Fig. 15) to and through check valve 196, and on through conduits 81d, 81c to main return conduit 81a.

The check valve 196 maintains a low back pressure in the system which may be of the order of five pounds.

During reciprocation of table 20, its speed of travel may be varied by rotation of flow-control valve 62, and the fluid volume for increment drive of the gear motor continues at the maximum volume regardless of how much the table speed may be throttled.

Reversal of the direction of the increment cross-feed may be attained by pulling cross-feed directional valve 120 outward to its outermost position in which the annular groove 121a registers with conduit 130. Referring to Fig. 14, the wider annular groove 121b will then be in register with both conduit 132 of the motor and exhaust conduit 138 leading to cylinder 160. Pipe conduit 134 will be in registration with annular groove 121a. Hence, pressure fluid from conduit 130 now enters pipe conduit 134 and passes thence to the motor, with the exhaust entering wider annular groove 121b and passing thence through conduit 138 to cylinder 60. The valve surface groove 136 opens into annular groove 121a.

By setting valve 120 in an intermediate position with annular groove 121a in register with conduit 132 of the motor, pressure conduit 130 will be closed and pipe conduit 134 will be in register with surface groove 136, thereby connecting both sides of the motor together for manual cross-feed in either direction. Fig. 4 shows the interlock 140 which positively prevents manual cross-feed excepting when valve 120 is in its intermediate position.

At times when continuous automatic cross-feed may be wanted, flow-control valve 62 may be pulled outward to its outermost position in which its tapering groove 63 registers with conduit 184. This cuts off pressure flow to table-reversing valve 66 and table 20 necessarily will be at rest. The pressure fluid passes through conduit 184 and enters conduit 130 leading to cross-feed directional valve 120, and rapid continuous cross-feed may be attained or a slower cross-feed suitable for truing wheel 14 may be attained by rotating valve 62.

In prior comparable hydraulic systems, a relatively long reversal time has been necessary to provide an adequate period of time for operation of a cross-feed whose speed unavoidably has been limited because of a prevalent danger of cavitation. The present invention controls the cross-feed by controlling the exhaust from the cross-feed motor, in conjunction with a shock-absorbing decelerating means, thereby eliminating all danger of cavitation and permitting fast table reversal. Heretofore it has been common practice to allow three inches of table travel for table reverse in order to provide time for one increment of cross-feed during a reversal of the table. The time consumed for this three inches of reversing travel of the table is approximately equal to the time it takes the table to travel twelve inches at its regular speed between reversals. Assuming that a six inch work piece is to be ground flat, in such a prior machine, the time consumed for one traverse of the six inch work piece necessarily will be equal to the time required for the table to travel eighteen inches at its regular speed, which represents a time loss equivalent to twelve inches of table travel at its regular speed. The herein disclosed control of increment cross-feed by controlling the exhaust from the cross-feed motor, in conjunction with the permitted attendant increased speed of table reversal, greatly reduces such table reversing time losses while getting quiet reversals which are devoid of shock.

Regarding the table reversing valve 66, it has been found desirable to mount the valve on ball or roller bearings, as represented at 230, 232 in Fig. 8. The bearings should have slightly less clearance than the spools of the valve so that they maintain the valve properly centered in the bore of the valve block. In the absence of such bearings, the films of oil which form around the spool surfaces might assume slightly eccentric shapes and pressure oil would tend to go into the thicker portions of the films, gradually forcing the spools toward one side of the bore with substantial elimination of the film at that side and eventual build-up of an objectionable amount of friction resisting rotation of the valve. The bearings 230, 232 effectively prevent the development of such an unbalanced oil-film condition.

Also, a comparable unbalanced pressure oil condition exists around the gears 104, 196 of the cross-feed motor but the unbalance, according to the invention, is greatly reduced by increasing the clearance between the tops or ends of the gear teeth and the walls of the bores throughout the major portion of the circumference of the gears, and having a close running fit between the tops or ends of the teeth and the bore walls only for short distances at opposite sides of the region of meshing of the gears. This is best seen in Fig. 8 wherein the portions of increased clearance are indicated at 234, 236. A close running fit is necessary at the inlet and exhaust sides of the gears to prevent leakage, and it is important to avoid wear at the tops or ends of the teeth. Hence, the increased clearance portions 234, 236 greatly reduce frictional wear of the teeth as well as reducing the unbalance of oil pressure around the gears. If the running clearance at the inlet and exhaust sides of the gears is equal, and assuming a pressure of 210 pounds at the inlet side and 10 pounds at the exhaust side, there will be a pressure drop approximating 100 pounds at the inlet running clearance, a pressure of approximately 110 pounds throughout the increased clearance portions 234, 236, and another drop approximating 100 pounds at the exhaust running clearance. The relatively long equal pressure portions 234, 236 tend to greatly reduce the unbalance of oil pressure acting on the gears, as compared with the case where a close running clearance extends from inlet to exhaust, with the incident much greater frictional wear of the teeth.

Referring now more particularly to Figs. 2 and 18, the hand lever 212 for starting reciprocation of table 20 actuates the start and stop valve 186 and the table interlock 226 as earlier described herein. However, the shaft on which lever 212 is fixed has the depending arm 238 fixed thereon for coaction with a dog 240 which is adjustable along the fixed rail 242, whereby travel of both the table 20 and cross-slide or saddle 16 may be stopped automatically following a predetermined amount of travel of the cross-feed slide or saddle 16. Preferably a roller 239 is provided on the lower end of depending arm 238 for engaging the dog 240 as the depending arm 238, carried on the cross-slide, moves toward the dog. In Fig. 2, the lever 212 is in its on position for traverse of table 20, and dog 240 is shown forward of the depending arm and its roller 239, in position to cam the depending arm and lever 212 clockwise as the cross-slide, moving toward the eye, brings roller 239 into engagement with the dog. This clockwise rotation of the lever shaft effects release of start and stop valve 186 for biased movement to its "stop" position, as earlier described, and moves the mechanical table interlock 226 to bring grooves 220' and 226' into registration, whereby manual feed of the table by hand wheel 218 is permitted. Hence, both table travel and cross-feed may be stopped automatically by the adjustable cross-feed dog 240, and may be stopped also by manual actuation of lever 212. If, after stopping of the power feed, the manual table feed is pushed into operative engagement with rack 224, the start and stop valve 186 cannot be moved to its start position so long as the manual feed continues engaged, because hand wheel shaft 220 will be engaged in groove 226' of interlock rod 226, preventing its movement to the left as viewed in Fig. 18 and thus locking valve 186 against being moved to the left to its start position. Similarly, the manual cross-feed cannot be engaged until the cross-feed directional valve 120 is brought to neutral position because interlock rod 140 prevents it excepting when notch 148 of the valve shaft is opposite the lower end of the interlock rod 140.

While it presently is considered preferable to have the table-reversing valve 66 rotatable rather than axially movable, comparable results may be attained with an axially movable table-reversing valve as shown in Figs. 21-24. In Fig. 21, the shaft 244 is a vertical shaft on the upper end of which the table-reversing lever 82 of the earlier described form may be fixed. The lower end of shaft 244 has fixed thereon the notched arm 246 whose notch receives pin 248 which projects at one end portion of a table-reversing valve indicated generally at 250. Valve 250 is axially movable in a suitable valve housing 252 and has the series of spools 254, 256, 258, 260 thereon. Spools 254, 256 are separated by the annular groove 262 which, in the illustrated position of the valve, is in register with the pressure fluid supply conduit 264. The valve, at groove 262 has the radial hole 266 communicating with an axial passage 268 which leads to the central portion of spool 258, at which location two opposite radial holes 270 lead outward through spool 258 from the axial passage 268, these radial holes 270 being shown in communication with cross-feed pressure conduit 272. Spool 260 is shown closing the exhaust conduit 274 leading from the cross-feed motor. As shown, the pressure fluid from pressure conduit 264 is connected to conduit 272 leading to the cross-feed motor, it being assumed that exhaust from the motor is entering a measuring or metering cylinder similar to the cylinder 160 of Fig. 15, the outlet from which is open into exhaust conduit 274. Arm 246 is in a mid-position of its table-reversing travel counterclockwise in Fig. 21. Both conduits 74, 76 leading to table cylinders are substantially closed but, as the valve moves further to the right, pressure fluid in gradually increasing amount is admitted through surface groove 257 to conduit 74 until, shortly, the valve groove 262 will be opposite conduit 74 directing full pressure into the right-hand table cylinder. Simultaneously, conduit 76 is gradually opened to exhaust and the exhaust outlet for conduit 74 is gradually closed, this latter outlet being immediately to the right of spool 256 in Fig. 21. This final reversing movement of the valve to the right closes cross-feed pressure conduit 272 and, when valve groove 276 comes opposite exhaust conduit 274, releases the measured quantity of exhaust from the cross-feed motor, which had been trapped in cylinder 160. A similar result is attained when the valve 250 moves to the left.

It should be understood that the herein represented grinding wheel 14, mounted on a horizontal axis, is exemplary rather than limiting, in that the grinding wheel may be mounted on a vertical slide having a vertical spindle, with a ring type, or a segmental type, of grinding wheel, if desired.

It is intended that the patent shall cover, by suitable expression in the appended claims, whatever features of patentable novelty exist in the invention disclosed.

I claim as my invention:

1. In a machine tool having a work support and a tool support of which the work support is reciprocable relative to the tool support and one of said supports is movable transversely of the direction of reciprocating travel of the work support, hydraulic means for reciprocating the work support and for moving said transversely movable support, said means comprising a pair of cylinders each having a ram operable therein and each ram being connected to a different end portion of said work support, a hydraulic motor operable to move said transversely movable support, a unitary valve operable to reverse the directions of travel of said rams by controlling flow of fluid to and from said cylinders and also timing flow of fluid to and from said hydraulic motor, coacting means on said work support and said valve whereby the valve is shifted as the work support approaches each limit of its reciprocating travel, thereby to reverse the direction of travel of the work support, said valve having means in permanently fixed relation thereon whereby, during each said shifting thereof, pressure fluid is admitted by said value to said hydraulic motor at a predetermined permanently fixed stage in the process of each said reversal and, at another stage in the process of each said reversal, the flow of pressure fluid to said hydraulic motor is cut off by said valve, followed by release through said valve to exhaust fluid from said hydraulic motor upon completion of each said shifting of said valve.

2. In a machine tool having a work support and a tool support of which the work support is reciprocable relative to the tool support and one of said supports is movable transversely of the direction of reciprocating travel of the work support, hydraulic means for reciprocating the work support and for moving said transversely movable support, said means comprising a pair of cylinders each having a ram operable therein and each ram being connected to a different end portion of said work support, a hydraulic motor operable to move said transversely movable support, a unitary valve operable to reverse the directions of travel of said rams by controlling flow of fluid to and from said cylinders and also controlling flow of fluid to and from said hydraulic motor, coacting means on said work support and said valve whereby the valve is shifted as the work support approaches each limit of its reciprocating travel, thereby to reverse the direction of travel of the work support, load-and-fire means associated with said valve whereby each said shift of the valve includes a substantial rapid movement of the valve for effecting quick reversal of said work support, said valve, during each shifting thereof, admitting pressure fluid to said hydraulic motor at a predetermined permanently fixed stage in the process of each said reversal and, at another stage in the process of each said reversal, cutting off flow of pressure fluid to said hydraulic motor, followed by releasing through said valve exhaust fluid from said hydraulic motor upon completion of each said shifting of said valve.

3. In a machine tool having a work support and a tool support of which the work support is reciprocable relative to the tool support, hydraulic means for reciprocating the work support comprising a pair of cylinders each having a ram operable therein and each ram being connected to a different end portion of the work support, a substantially hydraulically balanced valve controlling flow of fluid to and from said cylinders and operable to reverse the direction of travel of the work support, said valve having cylindrical portions spaced apart axially along the valve having spaced surface grooves therein at predetermined locations around the peripheries of said cylindrical portions, and there being a separate conduit leading between said valve and each said cylinder and an exhaust conduit leading from said valve, said spaced grooves of the valve being arranged and adapted to register with different ones of said conduits when the valve is at each limit of its movements, and each of said spaced surface grooves having a tapering nozzle portion for gradually reducing and gradually increasing the volume of flow of fluid through said spaced grooves during each reversing operation of said valve thereby to minimize shock in the process of work support reversals.

4. In a machine tool having a work support and a tool support of which the work support is reciprocable relative to the tool support and one of said supports is movable transversely of the direction of reciprocating travel of the work support, hydraulic means for reciprocating the work support and for moving said transversely movable support, said means comprising a pair of cylinders each having a ram operable therein and each ram being connected to a different end portion of said work support, a hydraulic motor operable to move said transversely movable support, a rotary valve controlling flow of fluid to and from said cylinders and to and from said motor, a second valve controlling flow of that fluid going to said rotary valve and thence to a said cylinder but being out of the path of that fluid going to said motor, said rotary valve having one set of surface grooves for controlling the work support, and having another set of surface grooves, in permanently fixed relation to said first set, for controlling the hydraulic motor, and said second valve having a circumferential tapering groove whereby manual rotation thereof in one direction reduces flow of fluid to a said cylinder to throttle the work support while the full supply and pressure of fluid continues available for operating the hydraulic motor regardless of how much the work support may be throttled.

5. In a machine tool having a work support and a tool support of which the work support is reciprocable relative to the tool support and one of said supports is movable transversely of the direction of reciprocating travel of the work support, hydraulic means for reciprocating the work support and for transverse increment feed of said transversely movable support during the process of each reversal of the reciprocating work support, said hydraulic means comprising a hydraulic motor intermittently operable for effecting said increment transverse feed of said transversely movable support, a unitary valve controlling flow of fluid to and from said work support and to and from said motor and movable as a unit between two positions to effect the said reversals of the reciprocating work support and to effect an operation of said motor during the process of each said reversal, said valve having passage means therein for effecting the said control of flow of fluid to and from said work support and having other passage means therein, in permanently fixed relation to the first mentioned passage means, for effecting the said control of flow of fluid to and from said motor, and said valve, when being moved from one to the other of its said two positions, having a portion arranged and adapted to block the escape of fluid exhausting from the motor during each operation of the motor until said valve reaches a predetermined stage in each said movement thereof, at which stage said exhaust fluid from the motor is released through said other passage means in the valve.

6. In a machine tool having a reciprocating work support and a cross-slide supporting said work support and movable relative thereto, hydraulic means for driving the work support, a hydraulic motor for moving the cross-slide, a unitary valve for effecting the reversals of said work support and for controlling intermittent flow of pressure fluid to said motor, means for accumulating fluid exhausting from the motor during each intermittent operation of the motor, said means having adjustable capacity for accommodating only a predetermined volume of exhaust fluid whereby the motor stalls when said predetermined volume of exhaust fluid fills said accumulating means, and means responsive to an actuation of said valve for releasing said accumulated volume of exhaust fluid only after said valve has cut off the flow of pressure fluid to said motor, said valve having means thereon whereby the unitary valve effects a said reversal of the reciprocating work support and effects an operation of said motor at a predetermined stage in the reversal process, and also effects the said releasing of accumulated exhaust fluid from the motor at the end of the said reversal process.

7. In a machine tool having a reciprocable work support and a cross-slide movable transversely of the directions of reciprocating travel of the work support, hydraulic means for reciprocating the work support including conduits leading to and from the work support, and means for throttling the flow of fluid in a said conduit leading to the work support thereby to reduce the speed of travel of the work support, a hydraulic motor for intermittent increment feed of the cross-slide, inlet and exhaust conduits leading to and from said motor, a single unitary valve controlling said conduits leading to and from the work support for reversing the travel of the work support, conduit means leading from a source of pressure fluid to said throttling means and having a branch conduit by-passing said throttling means on a course leading to said valve, said valve having means coacting with said branch conduit and said motor inlet conduit for admitting the maximum available volume of pressure fluid to said motor during each reversal thereof regardless of throttling of the work support by said throttling means, thereby to effect intermittent operations of said motor, means in said motor exhaust conduit for accumulating a measured quantity of exhaust fluid from the motor during each operation of the motor, each said measured accumulation of exhaust fluid from the motor predetermining the amount of each increment of cross-slide feed, said valve having means for releasing each said measured accumulation of exhaust fluid at the end of each said reversal thereof and after the supply of pressure fluid to the motor has been cut off.

8. In a machine tool having a reciprocable work support and a cross-slide movable transversely of the directions of reciprocating travel of the work support, hydraulic means for reciprocating the work support, a single unitary valve operable to reverse the travel of the reciprocating work support, adjustable means on the work support for actuating said valve at a predetermined limit of movement of the work support in each direction of its reciprocating travel, a hydraulic motor operable intermittently for moving the cross-slide during each said reversing operation of said valve, conduit means for conducting pressure fluid to said valve, inlet and exhaust conduits leading between said valve and said motor, said valve having means coacting with said conduit means and said motor inlet conduit for admitting pressure fluid to said motor during each reversing actuation of the valve, thereby to effect an operation of the motor, means in said motor exhaust conduit for accumulating a measured quantity of fluid exhausting from the motor during each operation of the motor, thereby to stall the motor when said measured quantity of exhaust fluid has been accumulated, and means responsive to the latter part of each reversing actuation of said valve for releasing said accumulated exhaust fluid only after the supply of pressure fluid to said motor has been cut off.

9. In a machine tool having a reciprocable work support and a cross-slide movable transversely of the directions of reciprocating travel of the work support, hydraulic means for reciprocating the work support, a hydraulic motor operable for moving the cross-slide, a valve operable to reverse the travel of the reciprocating work support and having means for effecting an operation of said motor during each reversing operation of the valve, and a second valve rotatable in one position to control the flow of pressure fluid which drives the work support while the available flow of pressure fluid for operating said motor continues constant, and rotatable in another position for controlling a continuous flow of pressure fluid to said motor while cutting off the flow of pressure fluid for driving the work support, whereby the cross-slide may be driven continuously at various speeds while the work support is at rest.

10. In a machine tool, a reciprocable work table, a cross-slide on which said work table is mounted, hydraulic means for reciprocating said table and for feeding said cross-slide transversely of the directions of reciprocating travel of the table, said hydraulic means comprising a rotary valve operable to reverse the direction of travel of said table, adjustable means on the table for rotating said valve at a predetermined limit of movement of the table in each direction of its reciprocating travel, manual means for moving the work table in the directions of its reciprocating travel, a start and stop valve slidable between a stop position and a start position, means constantly biasing the latter said valve to its stop position in which it directs pressure fluid idly back to its source on a course which bypasses the work table, manually operable means for moving the stop and start valve, against said bias, to its start position, a latch for releasably holding the latter said valve in its start position in which it passes fluid both to and from the work table, and locking means responsive to movements of said start and stop valve for positively locking said manual table moving means against operation when said start and stop valve is in its said start position.

11. In a grinding machine, a reciprocable work table, a cross-slide on which said work table is mounted, hydraulic means for reciprocating said table and for feeding said cross-slide transversely of the directions of reciprocating travel of the table, said hydraulic means comprising a rotatable valve operable to reverse the direction of travel of said table, a hydraulic motor for feeding the cross-slide, a slide valve manually slidable between a position in which it connects said motor for cross-slide feeding operations of the motor and a position in which the inlet and outlet of the motor are connected together, means for manual feed of the cross-slide, and interlocking means extending between said slide valve and said manual feeding means for positively locking the latter said means against manual operation excepting when the slide valve is in its said position connecting together the inlet and the outlet of the motor.

12. In a grinding machine, a reciprocable work table, a cross-slide on which said work table is mounted, hydraulic means for reciprocating said table and for feeding said cross-slide transversely of the directions of reciprocating travel of the table, said hydraulic means comprising a valve operable between a position in which it connects the hydraulic system for drive of the work table in one direction and a position in which it connects the hydraulic system for drive of the work table in the opposite direction, a hydraulic motor for feeding the cross-slide, a motor reversing valve slidably mounted for movements between a position in which it passes pressure fluid to the motor for operation of the motor in one direction and a position in which it passes pressure fluid to the motor for operation of the motor in the opposite direction, and a flow-control valve mounted for both rotational and sliding movements and having a tapering circumferential groove, the latter said valve being manually slidable between a position in which it is rotatable to vary the flow of pressure fluid through said tapering groove for reciprocating said work table, and a position in which it is rotatable to vary the flow of pressure fluid through said tapering groove for operating said hydraulic motor.

13. In a grinding machine, a reciprocable work table, a cross-slide on which said work table is mounted, hydraulic means for reciprocating said table and for feeding said cross-slide transversely of the directions of reciprocating travel of the table, said hydraulic means comprising a unitary valve movable between two positions for reversing the direction of movement of the reciprocating work table, a hydraulic motor for feeding the cross-slide, means at a fixed location on said valve for admitting pressure fluid to said motor only during a table-reversing movement of the valve thereby to effect an operation of the motor during each table reversal, a closed chamber for receiving the exhaust fluid from the motor and having capacity for holding only a predetermined measured quantity of exhaust fluid from the motor, whereby accumulation of said measured quantity of exhaust fluid determines the extent of each motor operation, means on said valve for releasing said measured quantity of exhaust fluid at the end of each table reversal, and means fo rejecting the accumulated measured quantity of exhaust fluid from said chamber when said releasing means is in exhaust-releasing position.

14. In a grinding machine, a reciprocable work table, a cross-slide on which said work table is mounted, hydraulic means for reciprocating said table and for feeding said cross-slide transversely of the directions of reciprocating travel of the table, said hydraulic means comprising a valve movable between two positions for reversing the direction of movement of the reciprocating work table, a feed screw rotatably mounted for feeding said cross-slide, a hydraulic gear motor having one of its gears fixed to said feed screw whereby operation of the motor effects feed of the cross-slide, a longitudinal surface groove in said valve for admitting pressure fluid to said motor only during a table-reversing movement of the valve, thereby to effect an operation of said motor only during each table reversal, a closed chamber into which exhaust fluid from the motor delivers, manual means for varying the capacity of said chamber thereby to predetermine a measured quantity of fluid which can exhaust from the motor during each operation thereof, said measured quantity of exhaust fluid, when accumulated, preventing further operation of the motor, and a spring-biased piston operative in said closed chamber for ejecting exhaust fluid from the chamber after the supply of pressure fluid to the motor has been cut off.

15. A grinding machine comprising a cross-slide, means supporting said cross-slide, a hydraulic motor for moving said cross-slide on its supporting means, means for supplying pressure fluid to said motor to effect an operation thereof, walls defining a closed chamber for receiving and trapping fluid exhausting from the motor during an operation thereof whereby the capacity of said closed chamber determines the magnitude of the increment of cross-feed effected by an operation of the motor, a piston operable in said closed chamber and constantly biased toward one end of the chamber, said piston being adapted to move toward the other end of the chamber, in opposition to its said bias, in response to pressure of exhaust fluid entering the chamber from the motor, manually adjustable means for limiting the travel of said piston in said direction in opposition to its said bias thereby to selectively determine the effective capacity of said chamber for receiving exhaust fluid, shock-absorbing means associated with said piston for cushioning the final travel of the piston in each direction within the chamber, and means for releasing from said chamber the trapped exhaust fluid therein after the supply of pressure fluid to the motor has been cut off, said piston acting in the direction of its bias to eject the exhaust fluid from the chamber when said releasing means opens.

16. A grinding machine comprising a cross-slide, means supporting said cross-slide, a hydraulic motor for moving said cross-slide on its supporting means, means for supplying pressure fluid to said motor to effect an operation thereof, walls defining a closed chamber for receiving and trapping fluid exhausting from the motor during an operation thereof whereby the capacity of said closed chamber determines the magnitude of the increment of cross-feed effected by an operation of the motor, a primary piston operable in said closed chamber and constantly biased toward one end of the chamber, a secondary piston operable within the primary piston, means cushioning the relative travel of the two said pistons, manually adjustable means for limiting the travel of the secondary piston when it moves with the primary piston in response to pressure of exhaust fluid entering said chamber whereby the travel of the primary piston is limited by the secondary piston, and the final travel of the primary piston is a cushioned travel relative to the second piston, said travel of the primary piston being in opposition to its said bias and determining the effective capacity of said chamber for receiving exhaust fluid, and means for releasing trapped exhaust fluid from said chamber after the supply of pressure fluid to the motor has been cut off, said primary piston travelling in the direction of its bias to eject the released fluid when the releasing means opens.

17. A grinding machine comprising a cross-slide, means for supporting said cross-slide, a reciprocating table mounted on said cross-slide, hydraulic means for driving said reciprocating table, a hydraulic motor, mechanical drive connection between said cross-slide and said motor, means defining a closed chamber for trapping the fluid exhausting from the motor during an operation thereof whereby a predetermined accumulation of trapped exhaust fluid stalls the motor, a single unitary valve operable to effect the reversals of said reciprocating table and to admit pressure fluid to the motor only while the same said valve maintains said closed chamber closed against escape of trapped exhaust fluid, and operable to open said chamber for escape of trapped exhaust fluid only when the supply of pressure fluid to the motor has been cut off by the same said valve.

18. A grinding machine comprising a recipro- cating work table, a grinding wheel, a cross-slide on which the work table is mounted, a hydraulic motor for increment feed of the cross-slide, and means for predetermining the extent of each increment of cross-feed by a measured control of the motor exhaust, said means comprising a closed measuring chamber into which the motor exhaust delivers during each operation of the motor, manual means for adjusting the capacity of said chamber, a unitary valve for effecting the reversals of the reciprocating work table and for admitting pressure fluid to the motor only while said measuring chamber is closed by said valve against escape of exhaust fluid therefrom whereby accumulation of the measured quantity of exhaust fluid in said chamber stalls the motor, and means fixed in position on said value to open said chamber for escape of the accumulated exhaust fluid only when the supply of pressure fluid to the motor has been cut off by said valve.

19. In a machine tool having a reciprocable support and a cross-slide movable transversely of the directions of reciprocating travel of the support, means for hydraulic reciprocation of said support, a hydraulic motor for moving said cross-slide, a unitary valve controlling flow of pressure fluid to both said support-reciprocating means and said motor, adjustable means on said reciprocating support for shifting said valve to effect a reversal of the direction of travel of the support, said valve having ports and grooves therein relatively arranged for directing pressure fluid to said motor during each reversal of said support, said grooves being at different angular locations around the axis of the valve, and means for minimizing heat generation in response to a reversing shift of said valve, comprising relatively short nozzle shaped tapering projections of said valve grooves extending in the direction of movements of the valve for gradually accelerating the rate of flow of fluid, at gradually diminishing pressure and volume, to said support-reciprocating means simultaneously with a gradual increase of flow of pressure fluid to said motor, followed by gradually accelerating the rate of flow of fluid, at gradually diminishing pressure and volume, to said motor simultaneously with gradual increase of flow of pressure fluid to said support-reciprocating means.

20. In a machine tool having a reciprocable support and a cross-slide movable transversely of the directions of reciprocating travel of the support, means for hydraulic reciprocation of said support, a hydraulic motor for moving said cross-slide, a valve controlling flow of pressure fluid to both said support-reciprocating means and said motor, adjustable means on said reciprocating support for shifting said valve to effect a reversal of the direction of travel of the support, said valve having ports and grooves therein relatively arranged for directing pressure fluid to said motor during each reversal of said support, and having provision for opening said motor constantly to exhaust excepting during a said reversing shift of the valve.

21. In a machine tool having a reciprocating support and a cross-slide movable transversely of the directions of reciprocating travel of the support, means for hydraulic reciprocation of said support, a hydraulic motor for moving said cross-slide, a reversing valve controlling flow of pressure fluid to both said support-reciprocating means and said motor, a single source of pressure fluid, conduit means for delivering pressure fluid from said single source to said reversing valve, including a first conduit for delivering pressure fluid to said reversing valve for reciprocating said support and a second conduit for delivering pressure fluid to said reversing valve for operating said motor, adjustable means on said reciprocating support for shifting said reversing valve to effect a reversal of the direction of travel of the support and to effect an operation of said motor during said reversal, and a manually operable flow control valve in said first conduit for selectively reducing the volume of flow of pressure fluid to said support-reciprocating means while leaving the maximum fluid volume available for operating said motor.

22. In a machine tool having a support with a cross-slide movably mounted thereon, a feed screw carried by said cross-slide and rotatably mounted thereon, means fixed relative to the cross-slide threadedly engaging said feed screw whereby rotation of said feed screw effects movement of the cross-slide, a first gear fixed on said feed screw, a second gear meshing with said first gear, manually engageable means for manually rotating said second gear thereby to effect manual movement of the cross-slide, means providing a closely surrounding liquid-tight housing around said gears whereby said gears and said housing constitute a hydraulic gear motor, said housing having inlet and outlet conduits for flow of pressure fluid to and from said motor thereby to effect intermittent increments of power feed of the cross-slide, means for connecting said inlet and outlet conduits together whenever said manually engageable means is engaged for manual feed of the cross-slide, and means for locking said manually engageable means out of gear-rotating engagement whenever said gear motor is in condition for power feed of the cross-slide.

23. In a machine tool having a work support and a tool support of which one is reciprocable relative to the other and one is movable transversely of the directions of reciprocation of the reciprocable support, a motor connected to said transversely movable support and responsive to fluid pressure for effecting transverse movements of said transversely movable support, fluid pressure means, including conduits leading to and from said reciprocable support and conduits leading to and from said motor, whereby pressure fluid actuates said reciprocable support and drives said motor, and a unitary valve having passage means therein for controlling the flow of fluid in said conduits to and from said reciprocable support and to and from said motor, said valve being movable between two positions in one of which it passes pressure fluid to and from said reciprocable support for driving said reciprocable support in one direction, and in the other of which it passes pressure fluid to and from said reciprocable support for driving said reciprocable support in the opposite direction, said unitary valve having other passage means therein, in permanently fixed relation to the first mentioned passage means, for passing pressure fluid to said motor only during a fractional part of each movement of said valve from one to the other of its said positions, whereby said motor is driven during a permanently precise and fixed fractional part of each movement of the valve from either one to the other of its two said positions.

24. A machine tool comprising, in combination, a work support and a tool support of which one is reciprocable relative to the other and one is movable transversely of the direction of travel of the said reciprocating support, hydraulic means for driving said reciprocating support and for moving said transversely movable support, said means comprising a hydraulic motor operable to move said transversely movable support, a single rigid valve element operable with load-and-fire action between two positions for reversing the direction of travel of said reciprocating support and for effecting an operation of said motor during each reversing operation of said valve element, means on said reciprocating support and said valve element directly coacting to effect an operation of said valve from one to the other of its said two positions at a predetermined stage of travel of said reciprocating support in each direction, whereby said valve reverses the direction of travel of said reciprocating support and effects an operation of said hydraulic motor in a predetermined precise timed relationship, a casing having a bore therein within which bore said valve element is mounted, anti-friction bearings for said valve element, at spaced locations therealong, for maintaining the valve concentric within the said bore of the casing, thereby to maintain substantial uniformity of thickness of the space between said valve element and the walls of said bore at all diametrically opposite locations along the extent of said valve element whereby pressure of fluid entering within said space is substantially equalized at said diametrically opposite locations along the extent of the valve element for maintaining at a minimum the resistance opposing actuation of said valve.

ELTON STILES CORNELL.

References Cited in the file of this patent

UNITED STATES PATENTS

| Number | Name | Date |
|---|---|---|
| 2,020,765 | Breitenbach | Nov. 12, 1935 |
| 2,115,950 | Gurries | May 3, 1938 |
| 2,127,877 | Maglott | Aug. 23, 1938 |
| 2,167,890 | Jackson | Aug. 1, 1939 |
| 2,269,697 | Silven | Jan. 13, 1942 |
| 2,276,625 | Patrick | Mar. 17, 1942 |
| 2,296,064 | Silven | Sept. 15, 1942 |
| 2,360,671 | Haas et al. | Oct. 17, 1944 |
| 2,378,066 | De Young | June 12, 1945 |
| 2,398,542 | Light | Apr. 16, 1946 |